US008165976B2

(12) United States Patent
Hinchey et al.

(10) Patent No.: US 8,165,976 B2
(45) Date of Patent: Apr. 24, 2012

(54) SYSTEMS, METHODS, AND APPARATUS FOR OTOACOUSTIC PROTECTION OF AUTONOMIC SYSTEMS

(75) Inventors: Michael G. Hinchey, Bowie, MD (US); Roy Sterritt, Newtownabbey (IE)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/230,922

(22) Filed: Sep. 13, 2011

(65) Prior Publication Data

US 2012/0023052 A1 Jan. 26, 2012

Related U.S. Application Data

(62) Division of application No. 11/836,352, filed on Aug. 9, 2007, now Pat. No. 8,041,655.

(60) Provisional application No. 60/822,687, filed on Aug. 17, 2006.

(51) Int. Cl.
*G06F 15/18* (2006.01)
(52) U.S. Cl. .......................................................... 706/14
(58) Field of Classification Search ........................ None
See application file for complete search history.

(56) References Cited

U.S. PATENT DOCUMENTS 6,484,133 B1 * 11/2002 Vogt ............................... 702/190

OTHER PUBLICATIONS

Awerbuch et al. "The Pulse Protocol: Sensor Network Routing and Power Saving", MILCOM 2004, pp. 662-667.*

* cited by examiner

*Primary Examiner* — Jeffrey A Gaffin
*Assistant Examiner* — Li-Wu Chang

(57) ABSTRACT

Systems, methods and apparatus are provided through which in some embodiments an autonomic unit transmits an otoacoustic signal to counteract a potentially harmful incoming signal.

1 Claim, 26 Drawing Sheets

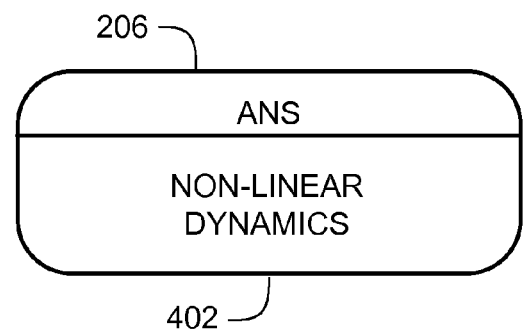
FIG. 4

SYSTEMS, METHODS, AND APPARATUS FOR OTOACOUSTIC PROTECTION OF AUTONOMIC SYSTEMS

This application is a continuation application of U.S. application Ser. No. 11/836,352, entitled "SYSTEMS, METHODS AND APPARATUS FOR OTOACOUSTIC PROTECTION OF AUTONOMIC SYSTEMS," filed Aug. 9, 2007. The content of this application is hereby incorporated by reference.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

A synthetic neural system is an information processing paradigm that is inspired by the way biological nervous systems, such as the brain, process information. Biological systems inspire system design in many other ways as well, for example reflex reaction and health signs, nature inspired systems (NIS), hive and swarm behavior, and fire flies. These synthetic systems provide an autonomic computing entity that can be arranged to manage complexity, continuous self-adjust, adjustment to unpredictable conditions, and prevention and recovery for failures.

One key element is the general architecture of the synthetic neural system. A synthetic neural system is composed of a large number of highly interconnected processing autonomic elements that may be analogous to neurons in a brain working in parallel to solve specific problems. Unlike general purpose brains, a synthetic neural system is typically configured for a specific application and sometimes for a limited duration.

In one application of autonomic elements, each of a number of spacecrafts could be a worker in an autonomous space mission. The space mission can be configured as an autonomous nanotechnology swarm (ANTS). Each spacecraft in an ANTS has a specialized mission, much like ants in an ant colony have a specialized mission. Yet, a heuristic neural system (HNS) architecture of each worker in an ANTS provides coordination and interaction between each HNS that yields performance of the aggregate of the ANTS that exceeds the performance of a group of generalist workers.

More specifically, subset neural basis functions (SNBFs) within a HNS can have a hierarchical interaction among themselves much as the workers do in the entire ANTS collective. Hence, although many activities of the spacecraft could be controlled by individual SNBFs, a ruler SNBF could coordinate all of the SNBFs to assure that spacecraft objectives are met. Additionally, to have redundancy for the mission, inactive workers and rulers can only participate if a member of their type is lost.

In some situations, the ANTS encounters a challenging situation. For example, in some instances, the operation of a particular autonomic spacecraft can be detrimental either to the autonomic spacecraft or to the mission.

BRIEF DESCRIPTION OF THE INVENTION

The above-mentioned shortcomings, disadvantages and problems may be addressed herein, which will be understood by reading and studying the following specification.

In at least one embodiment of the invention, a method for managing a system includes receiving a potentially harmful signal and transmitting an otoacoustic signal to counteract the potentially harmful signal.

In other embodiments, an autonomic element includes a self-monitor that is operable to receive information from sensors and is operable to monitor and analyze the sensor information and access a knowledge repository, a self-adjuster operably coupled to the self-monitor in a self-control loop, the self-adjuster operable to access the knowledge repository, the self-adjuster operable to transmit data to effectors, and the self-adjuster operable to plan and execute, an environment monitor that is operable to receive information from sensors and operable to monitor and analyze the sensor information and access the knowledge repository, and an autonomic manager communications component operably coupled to the environment monitor in an environment control loop, the autonomic manager communications component operable to access the knowledge repository, the autonomic manager communications component also operable to produce and transmit a counteracting signal to an incoming harmful signal.

In yet other embodiments, an autonomic system includes a plurality of autonomic agents performing one or more programmed tasks. The autonomic system also includes a coordinating autonomic agent for assigning programmed task and for issuing instructions to the plurality of autonomic agents. The autonomic system also includes a messenger autonomic agent for facilitating communication between the coordinating autonomic agent, plurality of autonomic agents, a remote system. One or more programmed task performed by the plurality of autonomic objects is at least generating signals indicative of a potentially harmful signal. The coordinating autonomic agent transmits an otoacoustic signal to one or more of the plurality of autonomic agents, based on the generated signals.

In still yet other embodiments, an autonomous nanotechnology swarm includes a first worker composed of self-similar autonomic components. The autonomous nanotechnology swarm also includes a second worker composed of self-similar autonomic components. The autonomous nanotechnology swarm also includes a third worker composed of self-similar autonomic components. In the autonomous nanotechnology swarm, the third worker facilitates communication between the first worker and the second worker. In the autonomous nanotechnology swarm, the first worker generates a heart beat monitor signal and pulse monitor signal. In the autonomous nanotechnology swarm, the second worker includes an otoacoustic component that is operable to counteract a harmful signal.

In further embodiments, a method includes instantiating an embryonic evolvable neural interface. The method also includes evolving the embryonic evolvable neural interface towards complex complete connectivity. The evolvable neural interface receives on or more heart beat signal, pulse monitor signal, and otoacoustic signal. The evolvable neural interface generates one or more heart beat monitor signal, pulse monitor signal, otoacoustic signals. The embryonic evolvable neural interface may include a neural thread possessing only a most primitive and minimal connectivity.

In yet a further embodiment, a method for protecting an autonomic system when encountering one or more autonomic agents includes determining the potential harm of the autonomic agent. The method also includes sending an otoacoustic signal to the autonomic agent and monitoring the response of the autonomic agent to the otoacoustic signal.

In still yet a further embodiment, a system includes a processor and a storage device coupled to the processor. The system also includes software means operative on the processor for sending an otoacoustic signal to the autonomic agent, monitoring the response of the autonomic agent to the otoacoustic signal, and determining the autonomic agent potential for causing harm to the autonomic system.

Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 4 is a block diagram of an autonomous neural system, according to an embodiment;

DETAILED DESCRIPTION OF THE INVENTION

In the following detailed description, reference is made to the accompanying drawings that form a part hereof, and in which is shown by way of illustration specific embodiments that can be practiced. These embodiments are described in sufficient detail to enable those skilled in the art to practice the embodiments, and it is to be understood that other embodiments can be utilized and that logical, mechanical, electrical and other changes can be performed without departing from the scope of the embodiments. The following detailed description is, therefore, not to be taken in a limiting sense.

The detailed description is divided into six sections. In the first section, a system level overview is described. In the second section, apparatus are described. In the third section, hardware and the operating environments in conjunction with which embodiments can be practiced are described. In the fourth section, particular implementations are described. In the fifth section, embodiments of methods are described. Finally, in the sixth section, a conclusion of the detailed description is provided.

System Level Overview

Figure 1:
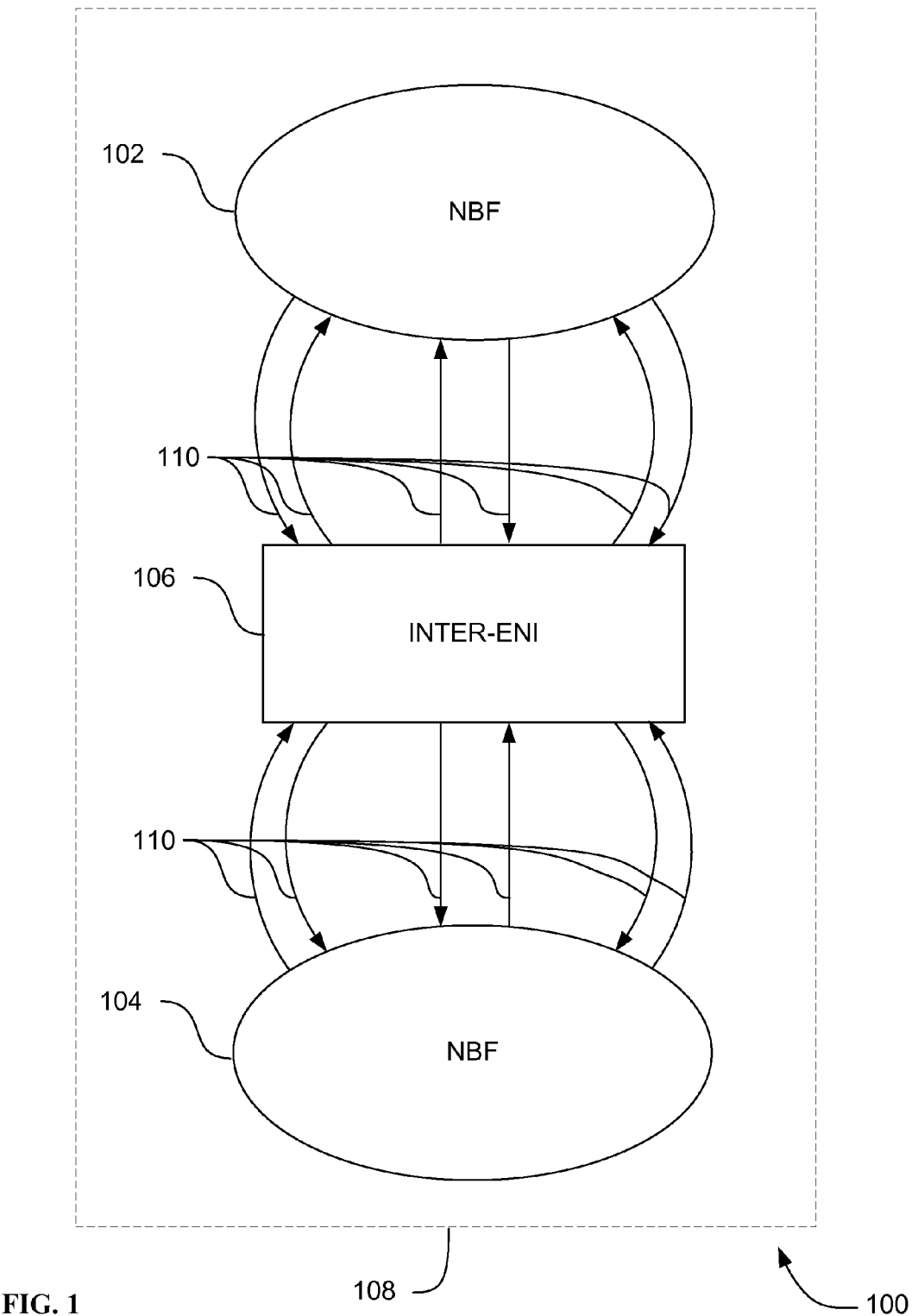
FIG. 1 is a block diagram that provides an overview of an evolvable synthetic neural system to manage collective interactions between autonomous entities, according to an embodiment of the invention.

FIG. 1 is a block diagram that provides an overview of an evolvable synthetic neural system to manage collective interactions between autonomous entities, according to an embodiment. System 100 can include a first plurality of neural basis functions (NBFs) 102 and 104. NBFs are the fundamental building block of system 100. In some embodiments of system 100, the plurality of NBFs includes more than the two NBFs 102 and 104 shown in FIG. 1. In some embodiments, system 100 includes only one NBF. One embodiment of a NBF is described below with reference to FIG. 2.

System 100 can also include a first inter-evolvable neural interface (ENI) 106 that is operably coupled to each of the first plurality of neural basis functions. The NBFs 102 and 104 can be highly integrated, and coupling between the NBFs through the ENI 106 provides a three dimensional complexity. Thus, for example, when system 100 is implemented on microprocessors such as microprocessor 804 described below with reference to FIG. 8, system 100 can provide a synthetic neural system that reconciles the two dimensional nature of microprocessor technologies to the three dimensional nature of biological neural systems.

This embodiment of the inter-ENI 106 can be known as an inter-NBF ENI because the inter-ENI 106 is illustrated as being between or among the NBFs 102 and 104 at the same level within a hierarchy. System 100 shows only one level 108 of a hierarchy, although one skilled in the art will recognize that multiple hierarchies can be used within the scope of this invention.

System 100 can also operate autonomously. A system operates autonomously when the system exhibits the properties of being self managing and self governing, often termed as autonomic, pervasive, sustainable, ubiquitous, biologically inspired, organic or with similar such terms. ENI 106 can adapt system 100 by instantiating new NBFs and ENIs and establishing operable communication paths 110 to the new NBFs and the ENIs to system 100. ENI 106 can also adapt system 100 by removing or disabling the operable communication paths 110 to the new NBFs and ENIs. The adapting, establishing, removing and disabling of the communication paths 110 can be performed autonomously. Thus, system 100 can satisfy the need for a synthetic neural system that performs significant tasks with complete autonomy.

System 100 can be capable of establishing and removing links to other similarly configured systems (not shown). Thus, the system 100 can be described as self-similar.

The system level overview of the operation of an embodiment is described in this section of the detailed description. Some embodiments can operate in a multi-processing, multi-threaded operating environment on a computer, such as computer 802 in FIG. 8.

While the system 100 is not limited to any particular NBF or ENI, for sake of clarity simplified NBFs and a simplified ENI are described.

Apparatus Embodiments

In the previous section, a system level overview of the operation of an embodiment is described. In this section, particular apparatus of such an embodiment are described by reference to a series of block diagrams. Describing the apparatus by reference to block diagrams enables one skilled in the art to develop programs, firmware, or hardware, including such instructions to implement the apparatus on suitable computers, and executing the instructions from computer-readable media.

Figure 8:
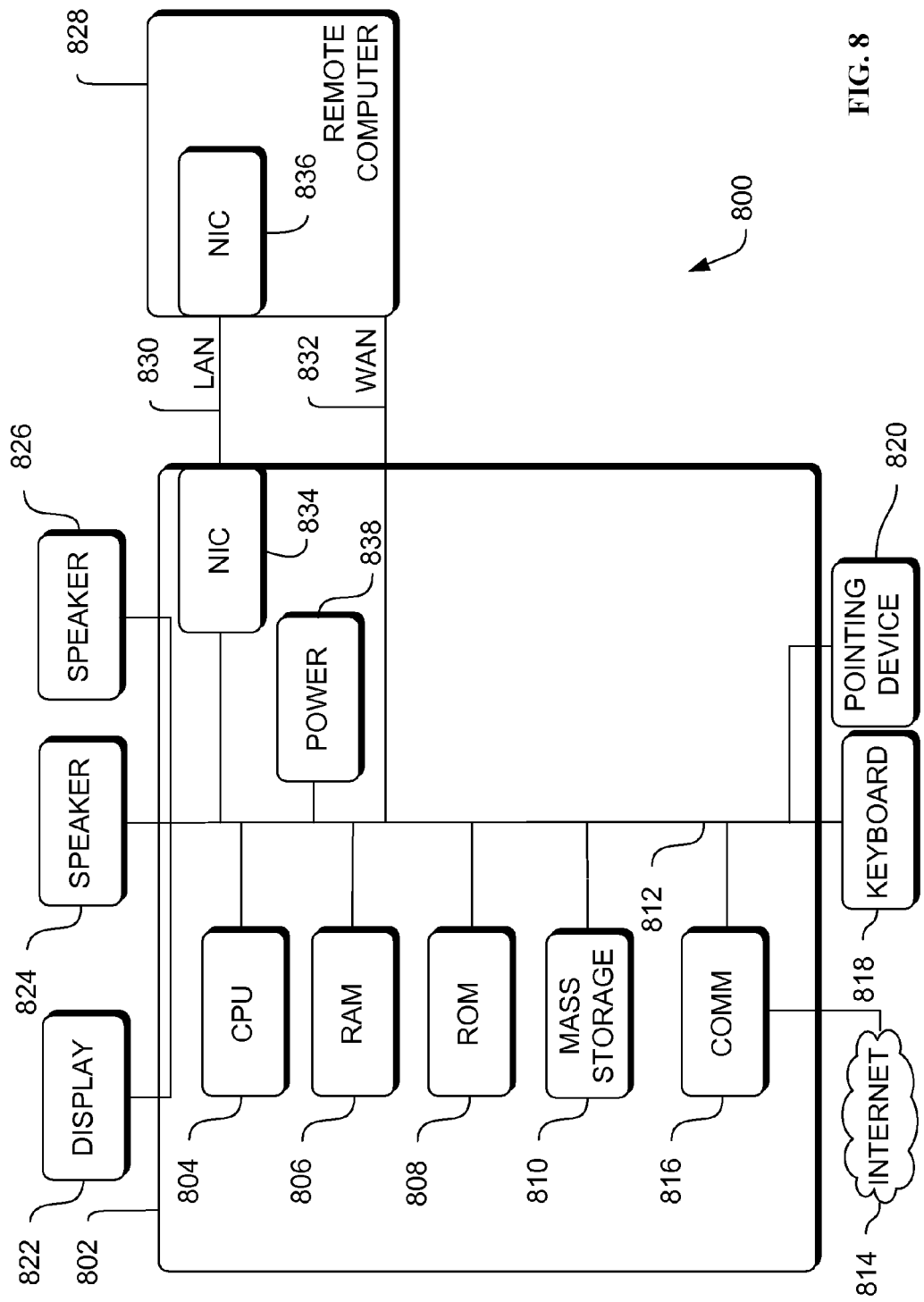
FIG. 8 is a block diagram of a conventional hardware and operating environment in which different embodiments can be practiced.

In some embodiments, apparatus 200-600 are implemented by a program executing on, or performed by firmware or hardware that is a part of a computer, such as computer 802 in FIG. 8.

Figure 2:
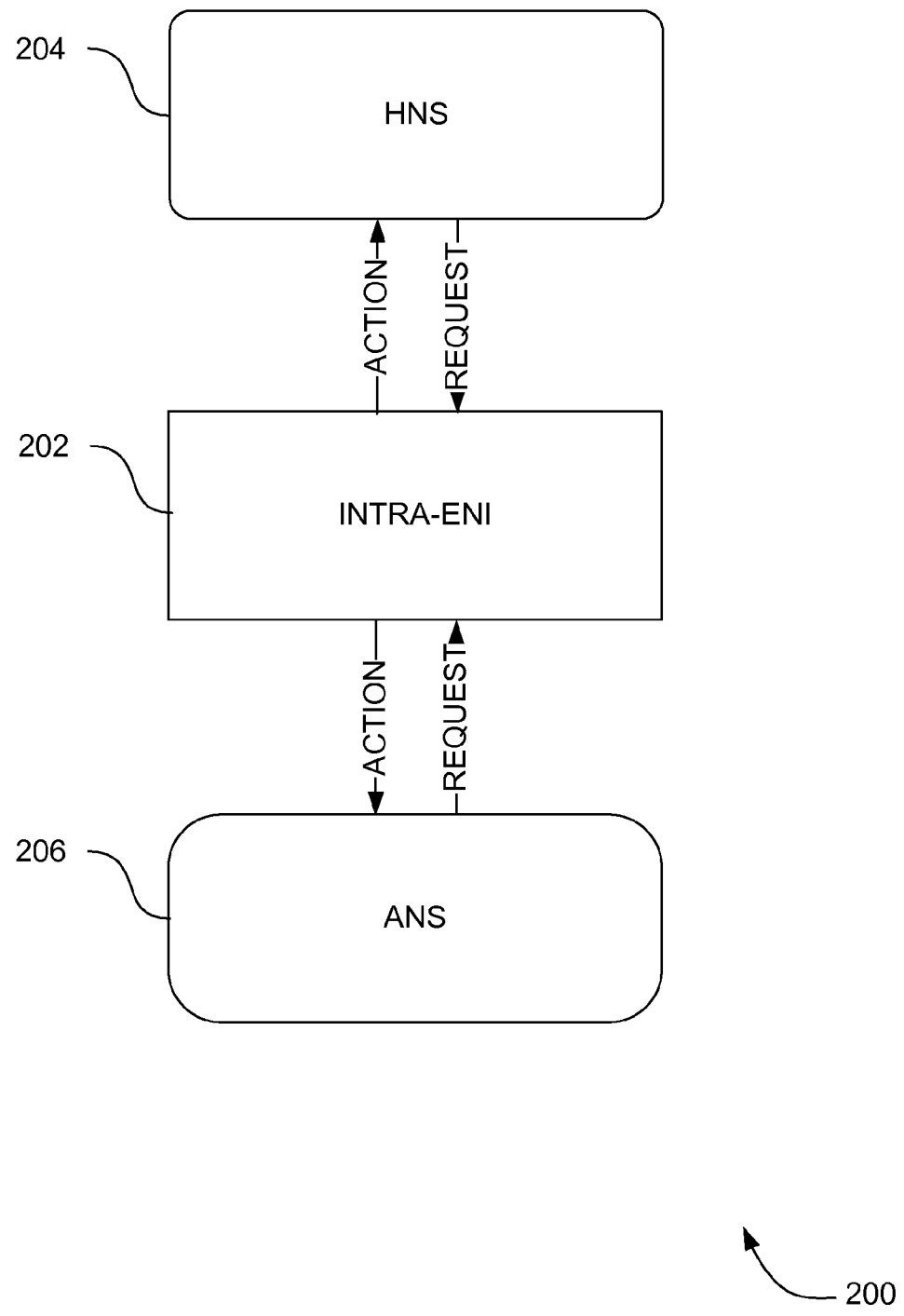
FIG. 2 is a block diagram of a neural basis function of a worker, according to an embodiment.

FIG. 2 is a block diagram of a neural basis function (NBF) 200 of a worker according to an embodiment. NBF 200 is illustrated as a bi-level neural system because both high-level functions and low-level functions are performed by NBF 200.

NBF 200 can include an intra-evolvable neural interface (intra-ENI) 202. The ENI 202 can be operably coupled to a heuristic neural system (HNS) 204 and operably coupled to an autonomous neural system (ANS) 206. The HNS 204 can perform high-level functions and the ANS 206 performs low-level functions that are often described as "motor functions" such as "motor" 1510 in FIG. 15 below. In NBF 200, the HNS 204 and the ANS 206 in aggregate can provide a function of a biological neural system. The intra-ENI 202 shown in FIG. 2 is an ENI that is wholly contained within an NBF, and is therefore prefixed with "intra."

The intra-ENI 202 can send action messages to and receive request messages from the HNS 204 and the ANS 206 during learning and task execution cycles, as well as during interfacing operations between the intra-ENI and the HNS 204 and the ANS 206 when the HNS 204 and the ANS 206 need to be modified as a result of other system failures or modification of objectives. NBF 200 is illustrated as a worker NBF because this NBF performs functions, but does not provide instructions commands to other NBFs.

Figure 3:
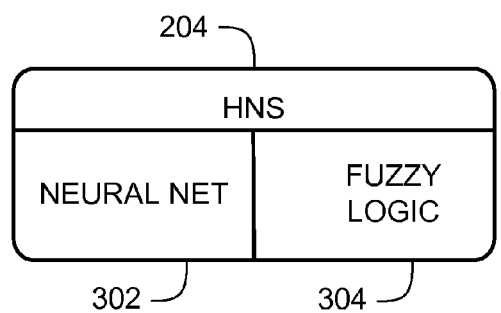
FIG. 3 is a block diagram of a heuristic neural system, according to an embodiment.
Figure 3:
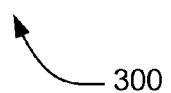

FIG. 3 is a block diagram of a heuristic neural system 300 according to an embodiment.

The heuristic neural system (HNS) 300 can be composed of a neural net 302 for pattern recognition and a fuzzy logic package 304 to perform decisions based on recognitions. Taken together the neural net 302 and the fuzzy logic package 304 can form a basis for a higher level heuristic intelligence.

FIG. 4 is a block diagram of an autonomous neural system 400 according to an embodiment.

The autonomous neural system (ANS) 400 can include a non-linear dynamics simulation 402 that represents smart servo system behavior.

Figure 5:
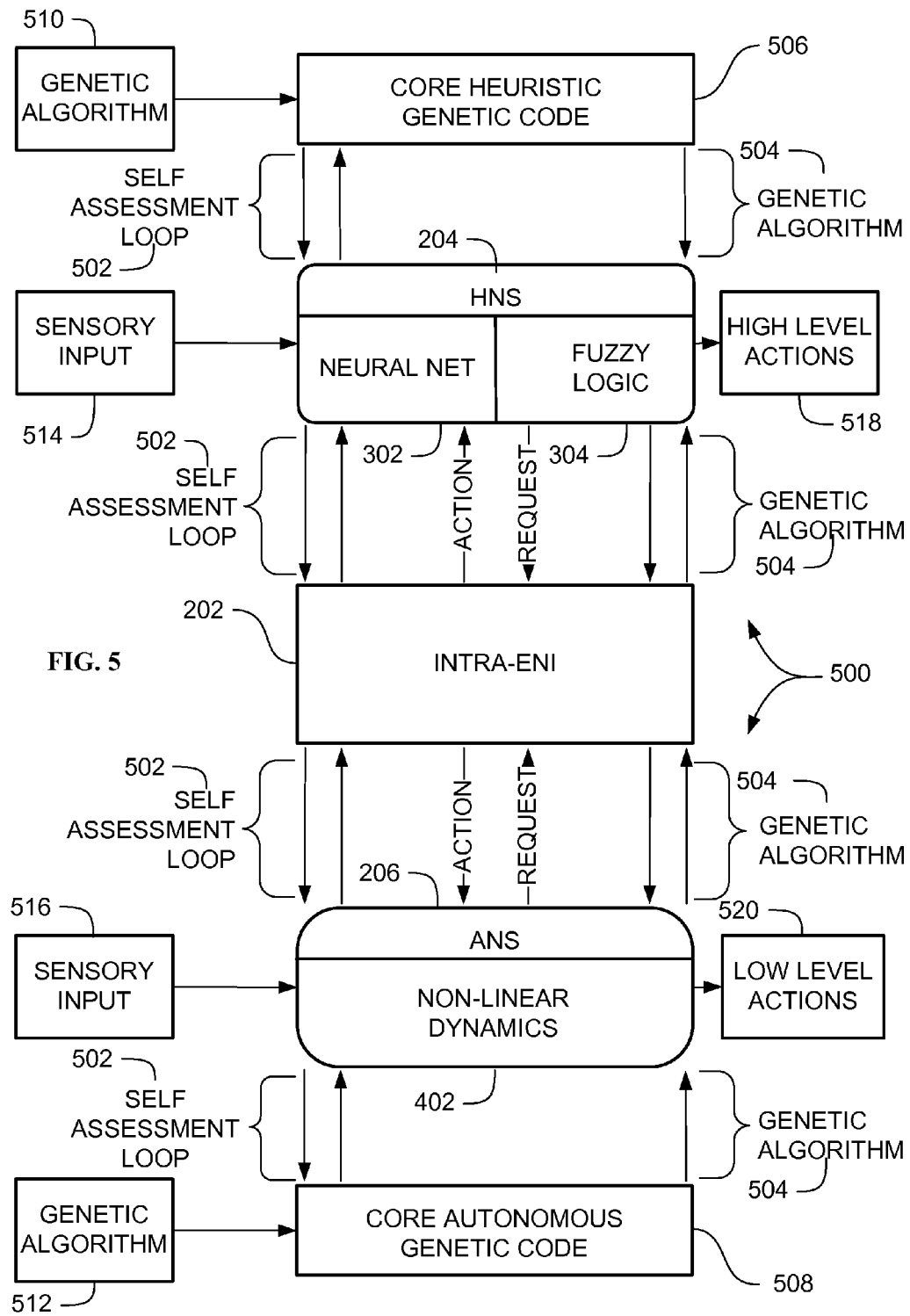
FIG. 5 is a block diagram of a neural basis function of a worker, according to an embodiment.

FIG. 5 is a block diagram of a neural basis function (NBF) 500 of a worker according to an embodiment. NBF 500 is shown as a bi-level neural system.

In some embodiments, NBF 500 can include a self assessment loop (SAL) 502 at each interface between autonomic components. Each SAL 502 can continuously gauge efficiency of operations of the combined HNS 204 and ANS 206. The standards and criteria of the efficiency can be set or defined by objectives of the NBF 500.

In some embodiments, NBF 500 can also include genetic algorithms (GA) 504 at each interface between autonomic components. The GAs 504 can modify the intra-ENI 202 to satisfy requirements of the SALs 502 during learning, task execution or impairment of other subsystems.

Similarly, the HNS 204 can have a SAL 502 interface and a GA 504 interface to a core heuristic genetic code (CHGC) 506, and the ANS 206 can have a SAL 502 interface and a GA 504 interface to a core autonomic genetic code (CAGC) 508. The CHGC 506 and CAGC 508 can allow modifications to a worker functionality in response to new objectives or injury. The CHGC 506 and the CAGC 508 autonomic elements can not be part of an operational neural system, but rather can store architectural constraints on the operating neural system for both parts of the bi-level system. The CHGC 506 and the CAGC 508 can both be modifiable depending on variations in sensory inputs via GAs 504.

In some embodiments, the CHGC 506 and the CAGC 508 in conjunction with SALs 502 and GAs 504 can be generalized within this self similar neural system to reconfigure the relationship between NBFs as well as to permit the instantiation of new NBFs to increase the overall fitness of the neural system. Thus, NBF 500 can provide a form of evolution possible only over generations of BNF workers.

In some embodiments, NBF 500 can also include genetic algorithms 510 and 512 that provide process information to the CHGC 506 and the CAGC 508, respectively. HNS 204 and ANS 206 can receive sensory input 514 and 516, respectively, process the sensory input and generate high level actions 518 and low level actions 520, respectively.

Figure 6:
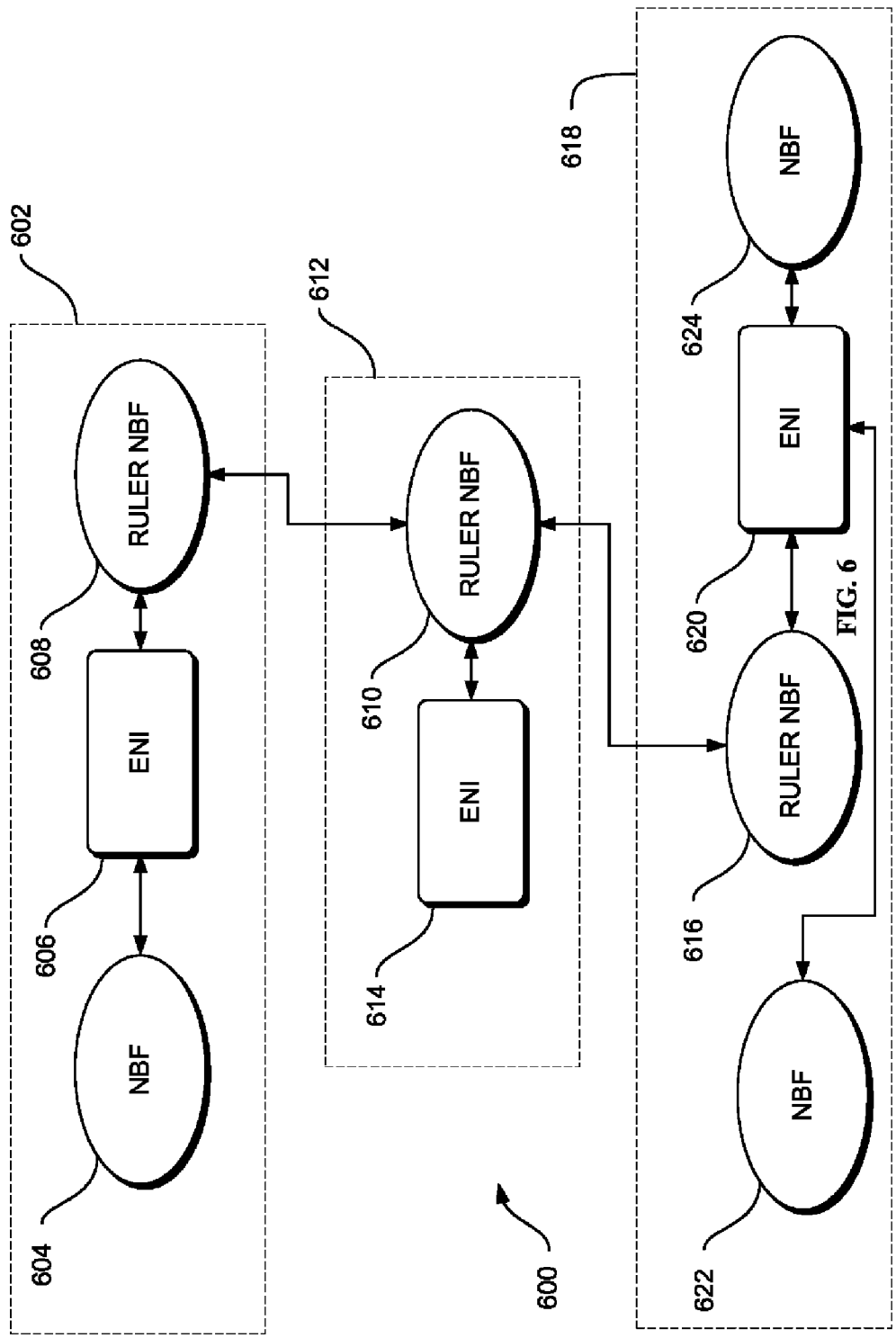
FIG. 6 is a block diagram of a multiple level hierarchical evolvable synthetic neural system, according to an embodiment.

FIG. 6 is a block diagram of a multiple level hierarchical evolvable synthetic neural system (ESNS) 600 according to an embodiment.

The multiple level hierarchical ESNS 600 can include a first level of hierarchy 602 that includes a NBF 604 and inter-ENI 606 and a ruler NBF 608. A ruler NBF, such as ruler NBF 608 can perform functions and also provide instructions commands to other subordinate NBFs.

The ruler NBF 608 of the first hierarchical level 602 is illustrated as being operably coupled to a ruler NBF 610 in a second hierarchical level 612. Ruler NBF 610 can perform functions, receive instructions and commands from other ruler NBFs that are higher in the hierarchy of the ESNS 600 and also provide instructions commands to other subordinate NBFs.

The second hierarchical level 612 can also include an inter-ENI 614. The second hierarchical level 612 of FIG. 6 shows the embodiment of an ESNS 600 having one NBF operably coupled to an ENI. The ruler NBF 610 of the second hierarchical level 612 can be operably coupled to a ruler NBF 616 in a third hierarchical level 618.

The third hierarchical level 616 can also include an inter-ENI 620. The third hierarchical level 616 of FIG. 6 shows the embodiment of an ESNS 600 having more than two NBFs (e.g. 616, 622 and 624) operably coupled to an ENI.

In some embodiments, the NBFs 604, 608, 610, 616, 622 and 624 can include the aspects of NBFs 102 and 104 in FIG. 1 above, and/or NBF 200 in FIG. 2 above. One skilled in the art will appreciate that many combinations exist that fall within the purview of this invention.

Hardware and Operating Environments

FIGS. 7, 8, 9 and 10 are diagrams of hardware and operating environments in which different embodiments can be practiced. The description of FIGS. 7, 8, 9 and 10 provide an overview of computer hardware and suitable autonomic computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server autonomic computing environments where remote devices that perform tasks are linked through a communications network. Program modules can be located in both local and remote memory storage devices in a distributed autonomic computing environment. Those skilled in the art will know that these are only a few of the possible computing environments in which the invention can be practiced and therefore these examples are given by way of illustration rather than limitation.

Figure 7:
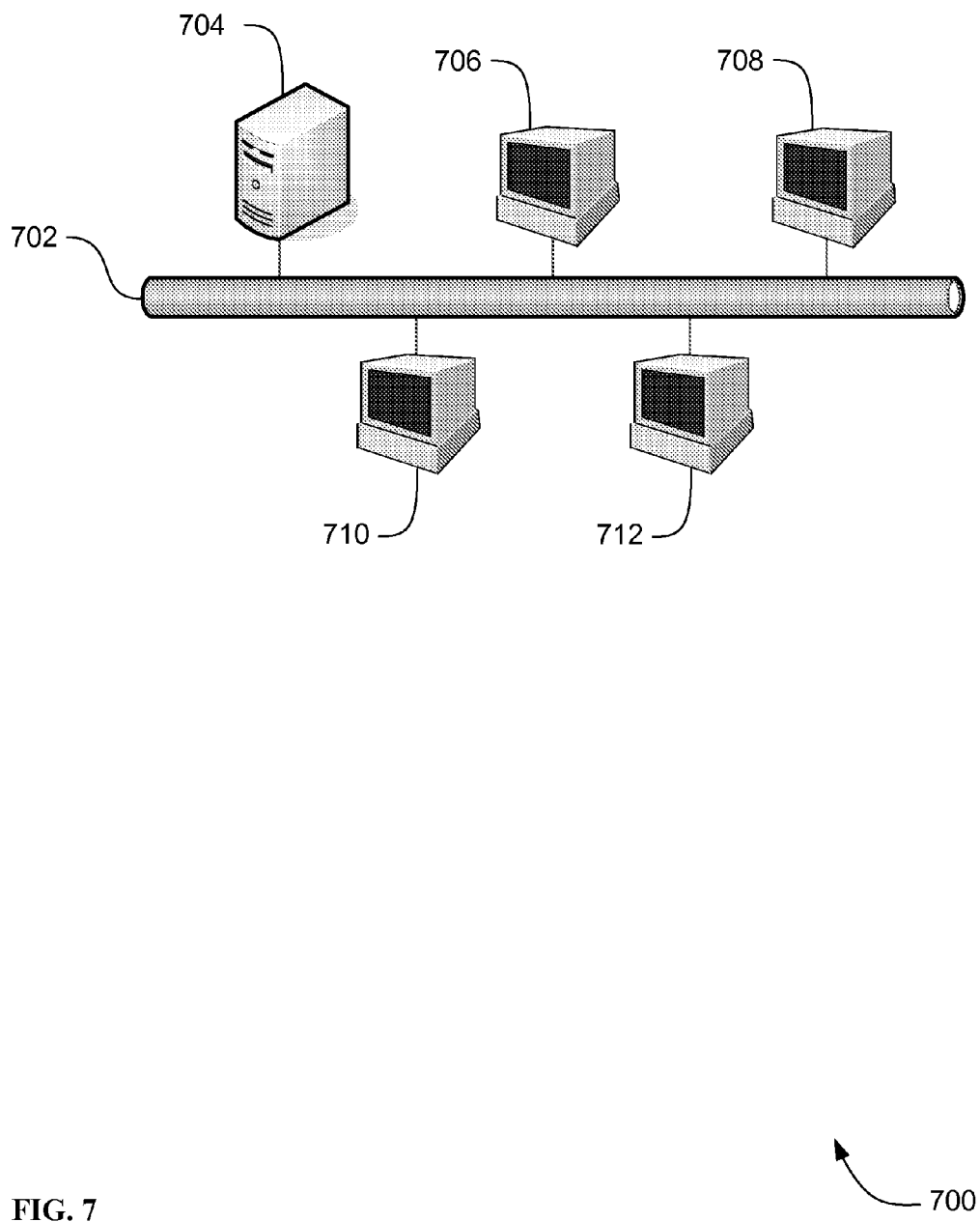
FIG. 7 is a block diagram of a conventional computer cluster environment in which different embodiments can be practiced.

FIG. 7 is a block diagram of a computer cluster environment 700 in which different embodiments can be practiced. System 100, apparatus 200, 300, 400, 500, 600, method 2000 and ESNS 1100 and 1200 can be implemented on computer cluster environment 700.

Computer cluster environment 700 can include a network 702, such as an EtherFast 10/100 backbone, that is operably coupled to a cluster server 704 and a plurality of computers 706, 708, 710 and 712. One possible embodiment of the computers is computer 802 described below with reference to FIG. 8. The plurality of computers can include any number of computers, but some implementations can include 7, 16, 32 and as many as 512 computers. The ESNSs and NBFs described above can be distributed on the plurality of computers.

One example of the computer cluster environment 700 is a Beowolf computer cluster. The computer cluster environment 700 provides an environment in which a plurality of ESNSs and NBFs can be hosted in an environment that facilitates cooperation and communication between the ESNSs and the NBFs.

FIG. 8 is a block diagram of a hardware and operating environment 800 in which different embodiments can be practiced. Computer 802 can include a processor 804, which can be a microprocessor, commercially available from Intel, Motorola, Cyrix and others. Computer 802 can also include random-access memory (RAM) 806, read-only memory (ROM) 808, and one or more mass storage devices 810, and a system bus 812, that operatively couples various system components to the processing unit 804. The memory 806, 808, and mass storage devices, 810, are illustrated as types of computer-accessible media. Mass storage devices 810 can be more specifically types of nonvolatile computer-accessible media and can include one or more hard disk drives, floppy disk drives, optical disk drives, and tape cartridge drives. The processor 804 can execute computer programs stored on the computer-accessible media.

Computer 802 can be communicatively connected to the Internet 814 via a communication device 816. Internet 814 connectivity is well known within the art. In one embodiment, a communication device 816 can be a modem that responds to communication drivers to connect to the Internet via what is known in the art as a "dial-up connection." In another embodiment, a communication device 816 can be an Ethernet® or similar hardware network card connected to a local-area network (LAN) that itself is connected to the Internet via what is known in the art as a "direct connection" (e.g., T1 line, etc.).

A user can enter commands and information into the computer 802 through input devices such as a keyboard 818 or a pointing device 820. The keyboard 818 can permit entry of textual information into computer 802, as known within the art, and embodiments are not limited to any particular type of keyboard. Pointing device 820 can permit the control of the screen pointer provided by a graphical user interface (GUI) of operating systems such as versions of Microsoft Windows®. Embodiments are not limited to any particular pointing device 820. Such pointing devices can include mice, touch pads, trackballs, remote controls and point sticks. Other input devices (not shown) could include a microphone, joystick, game pad, satellite dish, scanner, or the like.

In some embodiments, computer 802 can be operatively coupled to a display device 822. Display device 822 can be connected to the system bus 812. Display device 822 permits the display of information, including computer, video and other information, for viewing by a user of the computer. Embodiments are not limited to any particular display device 822. Such display devices can include cathode ray tube (CRT) displays (monitors), as well as flat panel displays such as liquid crystal displays (LCDs). In addition to a monitor, computers can typically include other peripheral input/output devices such as printers (not shown). Speakers 824 and 826 provide audio output of signals. Speakers 824 and 826 can also be connected to the system bus 812.

Computer 802 can also include an operating system (not shown) that could be stored on the computer-accessible media RAM 806, ROM 808, and mass storage device 810, and can be and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 can comprise a PC-compatible computer, a MacOS®-compatible computer, a Linux®-compatible computer, or a UNIX®-compatible computer. The construction and operation of such computers are well known within the art.

Computer 802 can be operated using at least one operating system to provide a graphical user interface (GUI) including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs include Netscape Navigator® and Microsoft Internet Explorer®.

The computer 802 can operate in a networked environment using logical connections to one or more remote computers, such as remote computer 828. These logical connections can be achieved by a communication device coupled to, or a part of, the computer 802. Embodiments are not limited to a particular type of communications device. The remote computer 828 could be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 can be connected to the local network 830 through network interfaces or adapters 834, which is one type of communications device 816. Remote computer 828 can also include a network device 836. When used in a conventional WAN-networking environment, the computer 802 and remote computer 828 can communicate with a WAN 832 through modems (not shown). The modem, which can be internal or external, is connected to the system bus 812. In a networked environment, program modules depicted relative to the computer 802, or portions thereof, can be stored in the remote computer 828.

Computer 802 can also include power supply 838. Each power supply can be a battery.

Figure 9:
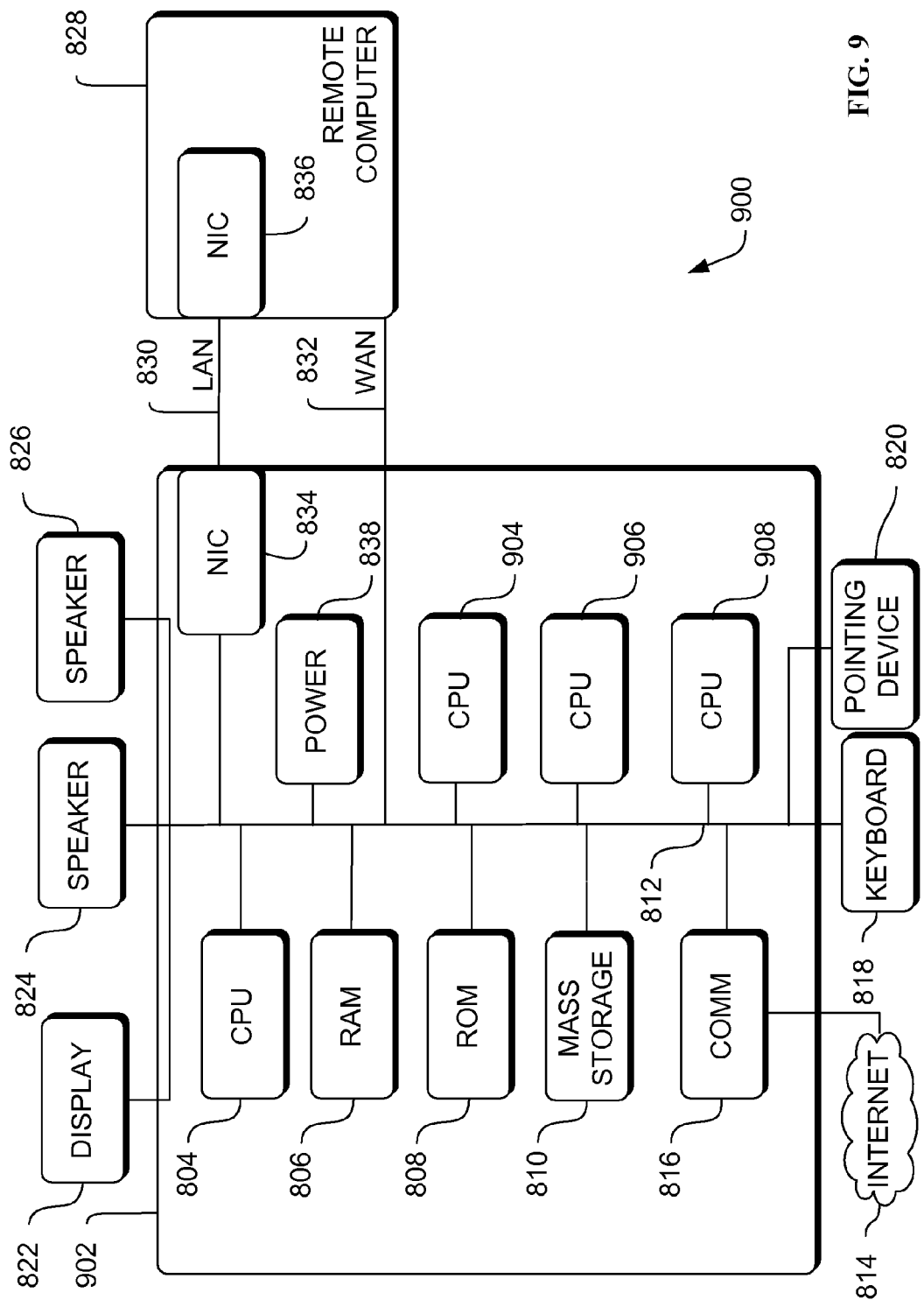
FIG. 9 is a block diagram of a conventional multiprocessor hardware and operating environment in which different embodiments can be practiced.

FIG. 9 is a block diagram of a multiprocessor hardware and operating environment 900 in which different embodiments can be practiced. Computer 902 can include a plurality of microprocessors, such as microprocessor 804, 904, 906, and 908. The four microprocessors of computer 902 can be one example of a multi-processor hardware and operating environment; other numbers of microprocessors can be used in other embodiments.

Similar to the computer cluster environment 700 in FIG. 7 above, the computer 902 can provide an environment in which a plurality of ESNSs and NBFs can be hosted in an environment that facilitates cooperation and communication between the ESNSs and the NBFs.

Figure 10:
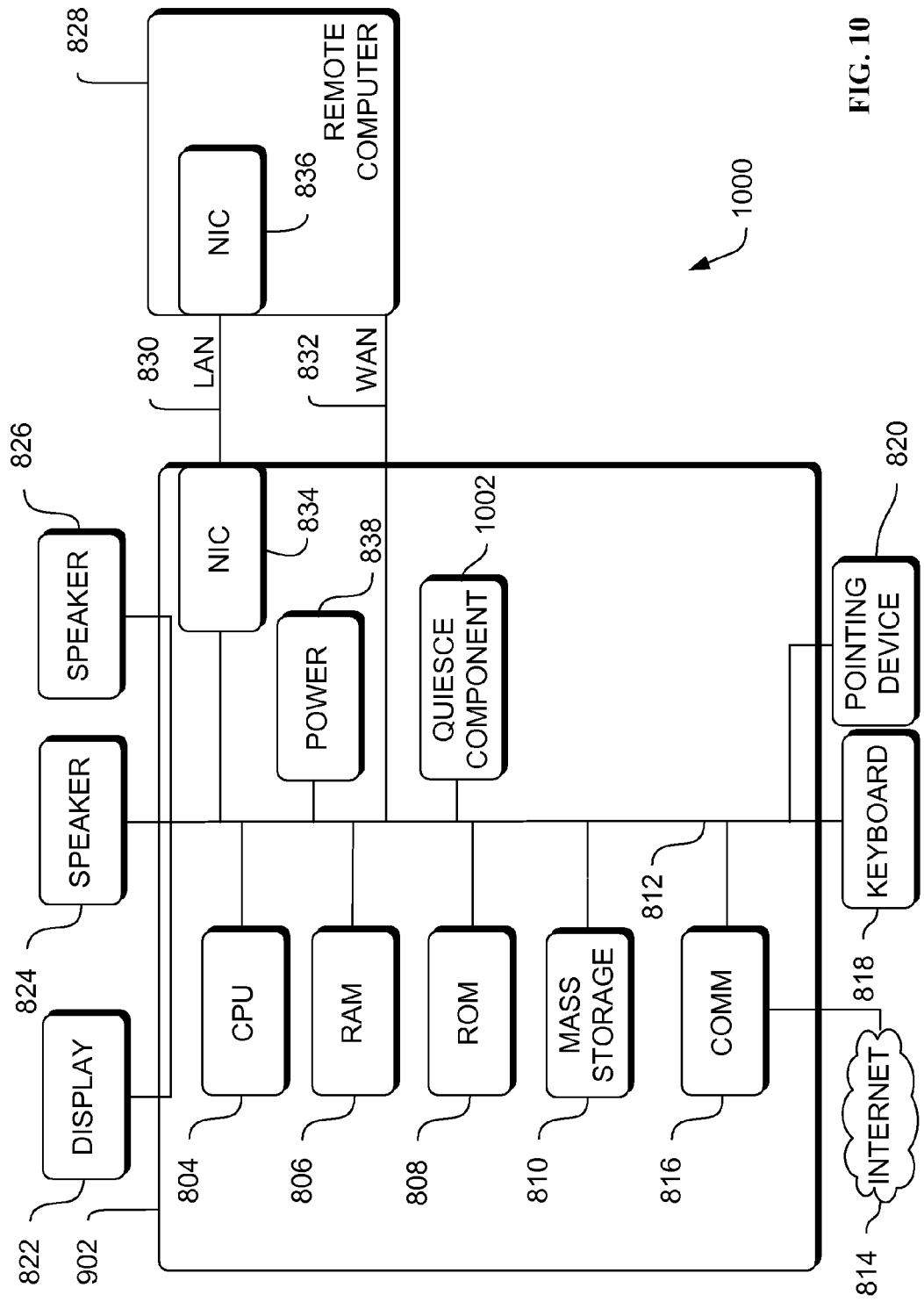
FIG. 10 is a block diagram of a hardware and operating environment, which includes a quiese component, according to an embodiment.

FIG. 10 is a block diagram of a hardware and operating environment 1000 which can include a quiese component, according to an embodiment. The hardware and operating environment 1000 reduces the possibility that an autonomic element will jeopardize the mission of the autonomic unit.

A quiesce component 1002 of an autonomic unit can render the autonomic unit inactive for a specific amount of time or until a challenging situation has passed. The quiesce component 1002 can be invoked when either an external supervisory entity or the autonomic unit itself determines that the autonomic unit could best serve the needs of the swarm by quiescing. Quiescing can render the autonomic unit temporarily inactive or disabled. Thus, the quiesce component 1002 can reduce the possibility that an autonomic element will jeopardize the mission of the autonomic element by deactivation or inactivating the autonomic element.

Quiesce time can be defined as the length of time taken to quiesce a system (to render the system inactive), or the length of time between periods of activity (i.e. the length of time of inactivity). The quiescing can be somewhat analogous to the cell lifecycle, were cells can stop dividing and go into a quiescent state.

Components of the system 100, apparatus 200, 300, 400, 500, 600, 1000, 1400, 1200, 1300, 1400, 1500 and 1600 and methods 1700, 1800, 1900, 2000, 2100, 2200, 2300, 2400, 2500 and 2600 can be embodied as computer hardware circuitry or as a computer-readable program, or a combination of both.

More specifically, in one computer-readable program embodiment, the programs can be structured in an object-orientation using an object-oriented language such as Java, Smalltalk or C++, and the programs can be structured in a procedural-orientation using a procedural language such as COBOL or C. The software components can communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 802 in FIG. 8, or on at least as many computers as there are components.

Figure 11:
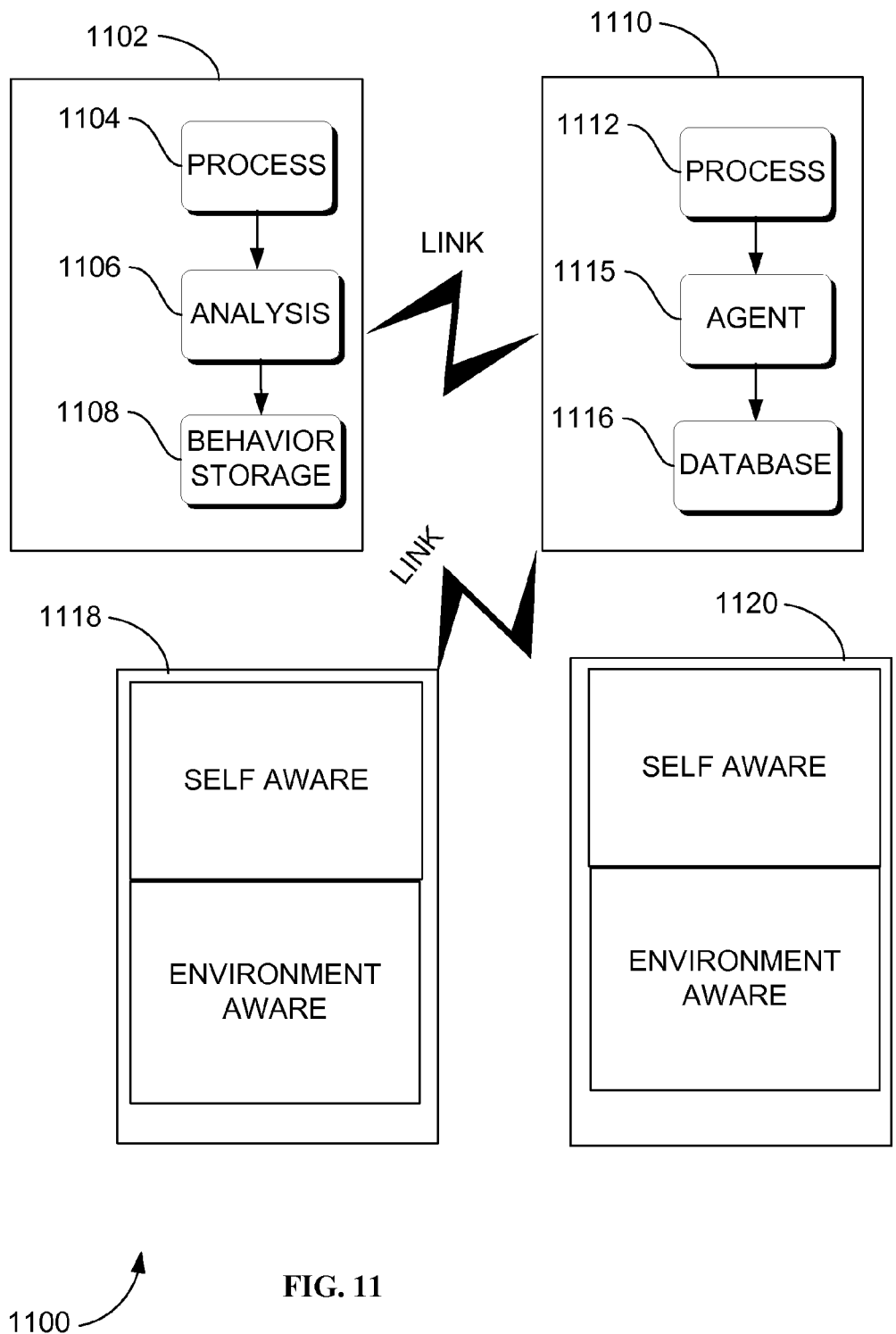
FIG. 11 is a diagram of autonomous entities' interaction, according to an embodiment.

Implementation of an Evolvable Synthetic Neural System in a Tetrahedral Architecture FIG. 11 is a diagram representation of a plurality of autonomic entities that have been assembled to perform a task. These entities can be self-configuring: adapt automatically to the dynamically changing environments; self-optimizing: monitor and tune resources automatically; self-protecting: anticipate, detect, identify, and protect against attacks from anywhere; and, self-healing: discover, diagnose, and react to disruptions. As shown with reference to autonomic entities 1118 and 1120 autonomic computing can have a self-aware layer and an environment aware layer. The self-aware layer of the autonomic entity (agent or other) can be comprised of a managed component and autonomic manager, which can be an agent, termed a self-managing cell (SMC). Control loops with sensors (self-monitor) and effectors (self-adjuster) together with system knowledge and planning/adapting policies can allow the autonomic entities to be self aware and to self manage. A similar scheme can facilitate environment awareness—allowing self managing if necessary, but without the immediate control to change the environment; this could be affected through communication with other autonomic managers that have the relevant influence, through reflex or event messages. The autonomic entities can be arranged or assigned distinctive roles such as worker entities, coordinating or managing entities, and message entities. Based on the task a ruler entity could be assigned a set of worker entities to manage inclusive of determining if a stay alive signal ought to be withdrawn. Further, the communication between the ruler and the worker can be facilitated through the message entity. The message entity could have the additional task of communicating with a remote system. In the case of space exploration, the remote system could be mission control on earth, mission control on an orbital platform, or any other arrangement that can facilitate that is external to the collection of autonomic elements. The remote system could be an autonomic entity acting like the project manager for the mission. Communication with mission control will be limited to the download of science data and status information. An example of such a grouping is shown in FIG. 11 where autonomic entity 1102 is shown as a ruler entity, autonomic entity 1110 as a message entity, and autonomic entities 1118 and 1120 are examples of worker entities. In terms of hardware, these entities can be all identical with the discernable difference being programming to accomplish assigned tasks. An added advantage to having identical hardware is replacing failed entities, which can be accomplished by activating software code found in the autonomic entity. If hardware differences exist they can be based on specialized equipment suitable for a particular task. However, at a minimum, certain functions or roles, such as ruler and messenger, can be expected to be within the skill set of all the autonomic entities.

As shown in FIG. 11, ruler autonomic entity 1102 can comprise a program or process 1104 executing in ruler entity 1102. Ruler entity 1102 can be implemented using a data processing system, such as data processing system 902 in FIG. 9, or in the form of an autonomous agent compiled by a data processing system. In the alternative, the ruler entity could be an autonomous nano-technology swarm that is launched from a factory ship for exploring planets, asteroids, or comets. Further, an analysis module 1106 or agent as executed by ruler entity 1102 can be used to monitor process 1104 and to receive pulse monitor and heart beat monitor signals from worker entities through the messenger entity. When the analysis module 1106 is used to monitor process 1104 the analysis module 1106 can be to detect errors or problems with the operation of process 1104.

As shown in FIG. 11, analysis agent 1106 can include an evaluator or other monitoring engine used to monitor the operation of process 1104. Analysis agent 1106 can be executed in response to some event. This event can be a periodic event, such as the passage of some period of time, data received from one or more of the worker entities. Further, the event can be the initialization of internal procedures in process 1104 or the starting or restarting of ruler entity 1102. Depending on the particular implementation, analysis agent 1106 can continuously run in the background monitoring process 1104 and analyzing the worker entity signals. See method 2100 in FIG. 21 below for actions taken by analysis agent module 1106 in formulating a strategy for the worker entities. Further, analysis agent 1106 can be subject to any self-healing routines found in ruler entity 1102.

This monitoring by analysis agent 1106 can be based on rules stored in behavior storage 1108, which could be used to compare the actual behavior of the received data to an expected behavior as defined in behavior storage 1108. In the present arrangement, behavior storage 1108 (ruler entity 1102) can be a collection of rules that can be updated by a remote computer through the messenger entity that reflects most current fixes (self-healing) or repair procedures and responses to worker entities upon the occurrence of an event, change in condition, or deviation from a normal operation. Behavior storage 1108 can be narrowly tailored based on the use and purpose of the autonomic entity, such as messenger entity 1110 and have only those procedures needed to perform its programming.

When messenger entity connects to remote computer at a command and control station, database 1116 can be updated with information that can later be used to program ruler entity or worker entity. In most cases a copy of the rules in database 1116 contains the most up-to-date information. If the objective changes or a solution to a problem requires an updated version not found within the autonomic entity, the entities can attempt to contact message entity 1110 to see if more recent or up-to-date information is available. If updates are available, these updates can be sent to the requesting entity for processing.

The information in behavior storage 1108 and databases in messenger and worker entity can include an array of values that are expected when selected process or operations are implemented in the respective entity. Examples processes can be initializing software, timing requirements, synchronization of software modules, and other metrics that can provide information concerning the running of a process within the respective entity. Examples operations can be data gathering, processing of information, controlling machinery, or any other operation where data processing systems are employed. These expected values can be compared to determine if an error condition has occurred in the operation of the entity. An error condition can be analyzed to determine its causes and possible correction. In the case of a worker entity, the error can be internally analyzed to select the appropriate self-healing procedure and the error can be sent to the ruler entity to be analyzed by analysis agent 1106 using the rules in behavior storage 1108. Based on the analysis, the ruler entity can elect to either withdraw the stay alive signal to the malfunctioning worker entity or wait a selected period to generate one or more stay alive signal, withdrawal of a stay alive signal, or a self-destruct signal. If the stay alive signal is withdrawn, the malfunctioning entity could be disconnected from the operation and the assigned to another entity or partially performed by the remaining entity to insure its completion.

Figure 12:
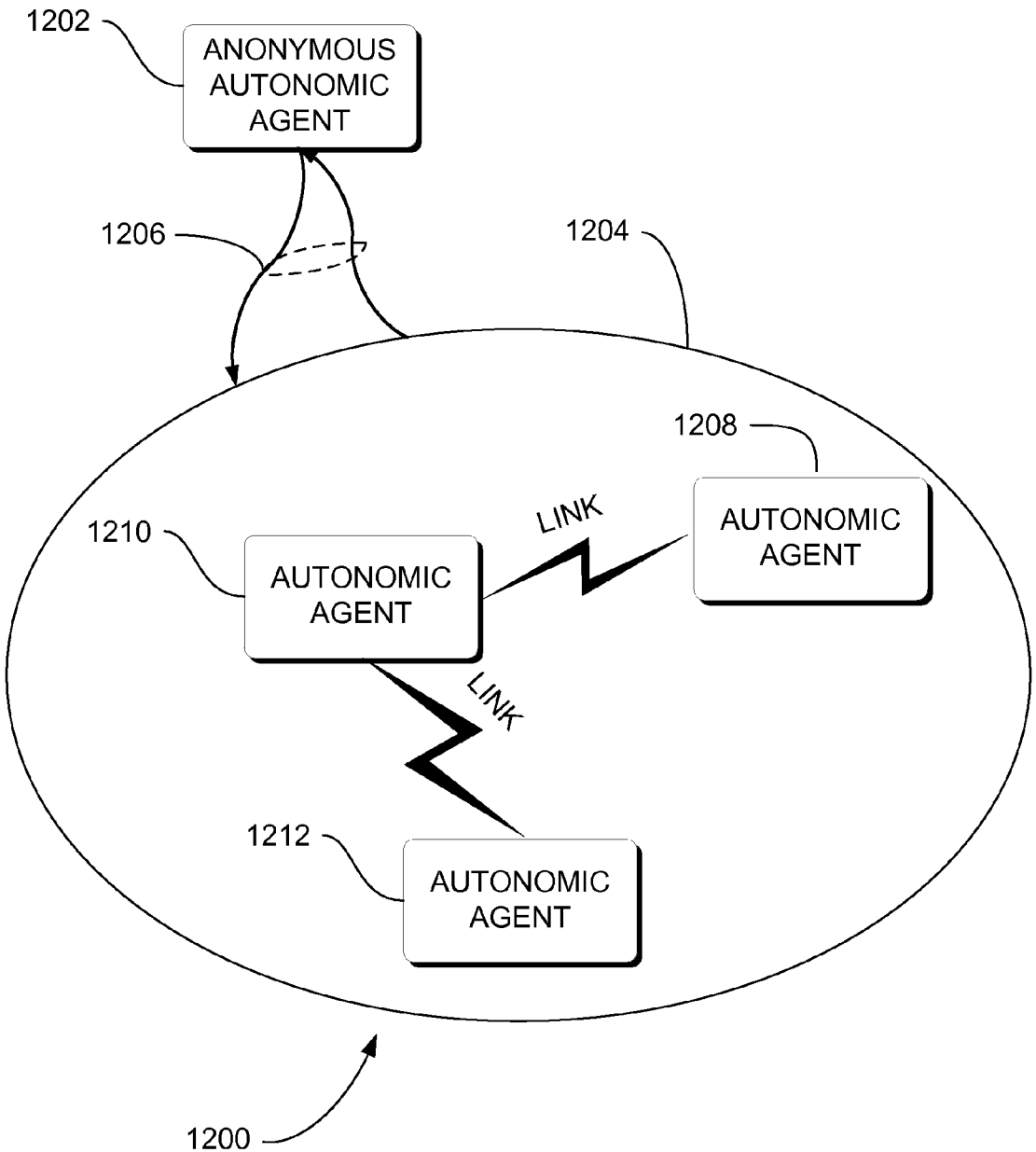
FIG. 12 is a block diagram of an autonomous entity management system, according to an embodiment.

FIG. 12 is a block diagram of an autonomous entity management system 1200 according to an embodiment. The system 1200 can be a generic system because the system 1200 represents a myriad of devices, processes, or device and process that perform a task in accordance to its programming or design. The illustrated system 1200 represents an instance when an autonomous system 1204 encounters an anonymous autonomic agent 1202. An anonymous autonomous agent can be a visiting agent, a mobile agent that can enter the sphere of influence of the autonomous system 1204, or any device for which the autonomous system 1204 has no established relationship. Example encounters can be a wireless device (agent) and communication tower (system), a client and server, a video subscriber and video provider, a process and an operating system. System 1200 manages autonomous entities that can be functionally extracted from an environment upon the occurrence of a predetermined condition such as a potential security breach.

The autonomous system 1204 can comprise one or more autonomic agents 1208, 1210, and 1212 all performing assigned functions and roles. As noted earlier, roles can be a combination of ruler, messenger, and worker. Functions can be data gathering, communication functions, scheduling, controlling, security, and so forth. Upon detecting anonymous autonomic agent 1202 the assigned autonomous agent for performing security functions for autonomous system 1204 can interrogate the anonymous autonomic agent 1202, requesting production of valid credentials. Detection can occur by employing various schemes such as when the anonymous autonomic agent 1202 requests resources from the system 1204 or from any autonomic entity that forms part of the system, response to polling signals from the autonomous system 1204, or through a friend or foe signal that indicates the presence of an anonymous entity 1202 in proximity to the autonomous system 1204.

To the autonomous system 1204, security can be important because of compromises by the accidental misuse of hosts by agents, as well as the accidental or intentional misuse of agents by hosts and agents by other agents. The result can be damage, denial-of-service, breach-of-privacy, harassment, social engineering, event-triggered attacks, or compound attacks. To prevent security breaches, visiting agents can be verified to have valid and justified reasons for being there as well as providing security to the visiting agent with interaction with other agents and host. Upon detection the visiting agent 1202 can be sent an asynchronous ALice signal (Autonomic license) 1206 requiring valid credentials from the agent 1202. The anonymous agent 1202 can need to work within the autonomic system 1204 to facilitate self-management, as such the anonymous agent 1202 and its host can need to be able to identify each other's credentials through such as an ALice signal. The autonomic system 1204 can establish certain response characteristics for the returned signal from the agent 1202. For example, the autonomic system 1204 can require a response in an appropriate format, within a certain timeout period, and with a valid and justified reason for being within the locust of interest or domain of the autonomous system 1204. For protection the autonomic system 1204 can make an assessment of the quality of the response from the anonymous agent 1202 to ascertain the potential of the agent for causing harm to the autonomous system 1204. Based on this determination the autonomous system 1204 can control the type of interaction with the agent 1202. The agent can be destroyed, blocked, partially blocked, stay alive signal withdrawn, or allowed to communicate with other agents within the autonomous system 1204. The protection can be triggered at any level of infraction or by a combination of infractions by the anonymous autonomous agent 1202 when responding to the ALice signal. If the agent 1202 fails to identify itself appropriately following an ALice interrogation, the agent 1202 can be blocked from the system and given either a self-destruct signal, or its "stay alive" reprieve is withdrawn. A consequence of unacceptable response within a timeout period is that the anonymous agent 1202 can be identified as an intruder or other invalid agent (process) and consequently, the anonymous agent 1202 is destroyed and/or excluded from communicating with other agents 1208, 1210, 1212 in the system. As an alternative to the ALice signal, a quiese signal, command or instruction can be sent. The quiesce signal is discussed in more detail in conjunction with FIGS. 10, 19 and 20.

Figure 13:
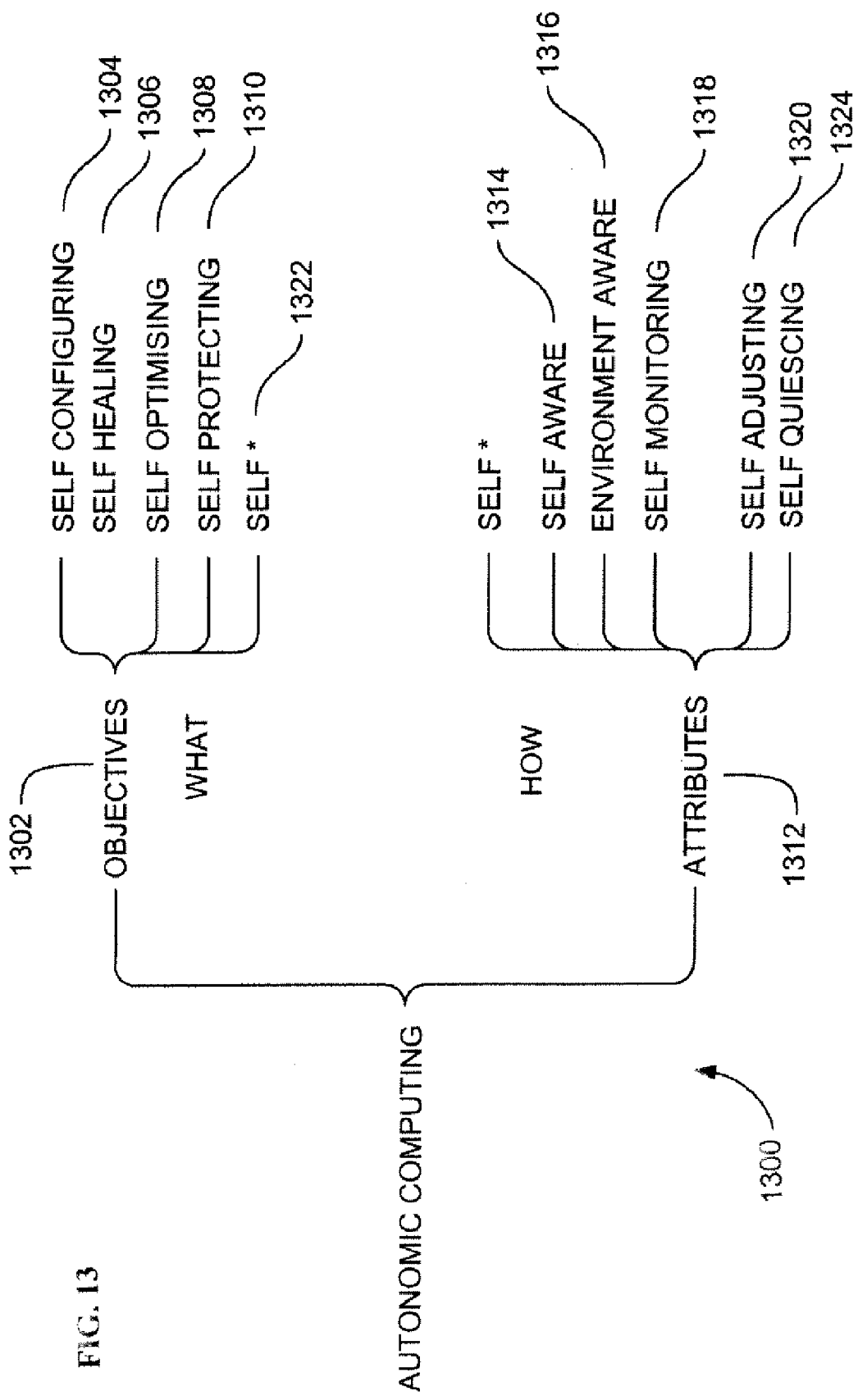
FIG. 13 is a hierarchical chart of an autonomous entity management system, according to an embodiment.

FIG. 13 is a hierarchical chart of an autonomous entity management system 1300 according to an embodiment. Properties that a system can possess in order to constitute an autonomic system are depicted in the autonomous entity management system 1300.

General properties of an autonomic (self-managing) system can include four objectives defined by International Business Machines 1302: self-configuring 1304, self-healing 1306, self-optimizing 1308 and self-protecting 1310, and four attributes 1312: self-awareness 1314, environment-awareness 1316, self-monitoring 1318 and self-adjusting 1320. One skilled in the art will recognize that other properties also exist, such as self-quiescing 1324. Essentially, the objectives 1302 could represent broad system requirements, while the attributes 1312 identify basic implementation mechanisms.

Self-configuring 1304 can represent an ability of the system 1300 to re-adjust itself automatically; this can simply be in support of changing circumstances, or to assist in self-healing 1306, self-optimization 1308 or self-protection 1310. Self-healing 1306, in reactive mode, is a mechanism concerned with ensuring effective recovery when a fault occurs, identifying the fault, and then, where possible, repairing it. In proactive mode, the self-healing 1306 objective can monitor vital signs in an attempt to predict and avoid "health" problems (i.e. reaching undesirable situations).

Self-optimization 1308 can mean that the system 1300 is aware of ideal performance of the system 1300, can measure current performance of the system 1300 against that ideal, and has defined policies for attempting improvements. The system 1300 can also react to policy changes within the system as indicated by the users. A self-protecting 1310 system 1300 can defend the system 1300 from accidental or malicious external attack, which necessitates awareness of potential threats and a way of handling those threats.

Self-managing objectives 1302 can require awareness of an internal state of the system 1300 (i.e. self-aware 1314) and current external operating conditions (i.e. environment-aware 1316). Changing circumstances can be detected through self-monitoring and adaptations are made accordingly (i.e. self-adjusting 1320). Thus, system 1300 can have knowledge of available resources, components, performance characteristics and current status of the system, and the status of interconnections with other systems, along with rules and policies therein can be adjusted. Such ability to operate in a heterogeneous environment can require the use of open standards to enable global understanding and communication with other systems.

These mechanisms may not be independent entities. For instance, if an attack is successful, this can include self-healing actions, and a mix of self-configuration and self-optimisation, in the first instance to ensure dependability and continued operation of the system, and later to increase the self-protection against similar future attacks. Finally, these self-mechanisms could ensure there is minimal disruption to users, avoiding significant delays in processing.

Other self* properties have emerged or have been revisited in the context of autonomicity. We highlight some of these briefly here. Self-* 1322 can be self-managing properties, as follows. Self-anticipating is an ability to predict likely outcomes or simulate self-* actions. Self-assembling is an assembly of models, algorithms, agents, robots, etc.; self-assembly is often influenced by nature, such as nest construction in social insects. Self-assembly is also referred to as self-reconfigurable systems. Self-awareness is "know thyself" awareness of internal state; knowledge of past states and operating abilities. Self-chop is the initial four self-properties (Self-Configuration 1304, Self-Healing 1306, Self-Optimisation 1308 and Self-Protection 1310). Self-configuring is an ability to configure and re-configure in order to meet policies/goals. Self-critical is an ability to consider if policies are being met or goals are being achieved (alternatively, self-reflect). Self-defining is a reference to autonomic event messages between Autonomic Managers: contains data and definition of that data-metadata (for instance using XML). In reference to goals/policies: defining these (from self-reflection, etc.). Self-governing is autonomous: responsibility for achieving goals/tasks. Self-healing is reactive (self-repair of faults) and proactive (predicting and preventing faults). Self-installing is a specialized form of self-configuration-installing patches, new components, etc or re-installation of an operating system after a major crash. Self-managing is autonomous, along with responsibility for wider self-* management issues. Self-optimizing is optimization of tasks and nodes. Self-organized is organization of effort/nodes; particularly used in networks/communications. Self-protecting is an ability of a system to protect itself. Self-reflecting is an ability to consider if routine and reflex operations of self-* operations are as expected and can involve self-simulation to test scenarios. Self-similar is self-managing components created from similar components that adapt to a specific task, for instance a self-managing agent. Self-simulation is an ability to generate and test scenarios, without affecting the live system. Self-aware is self-managing software, firmware and hardware.

Figure 14:
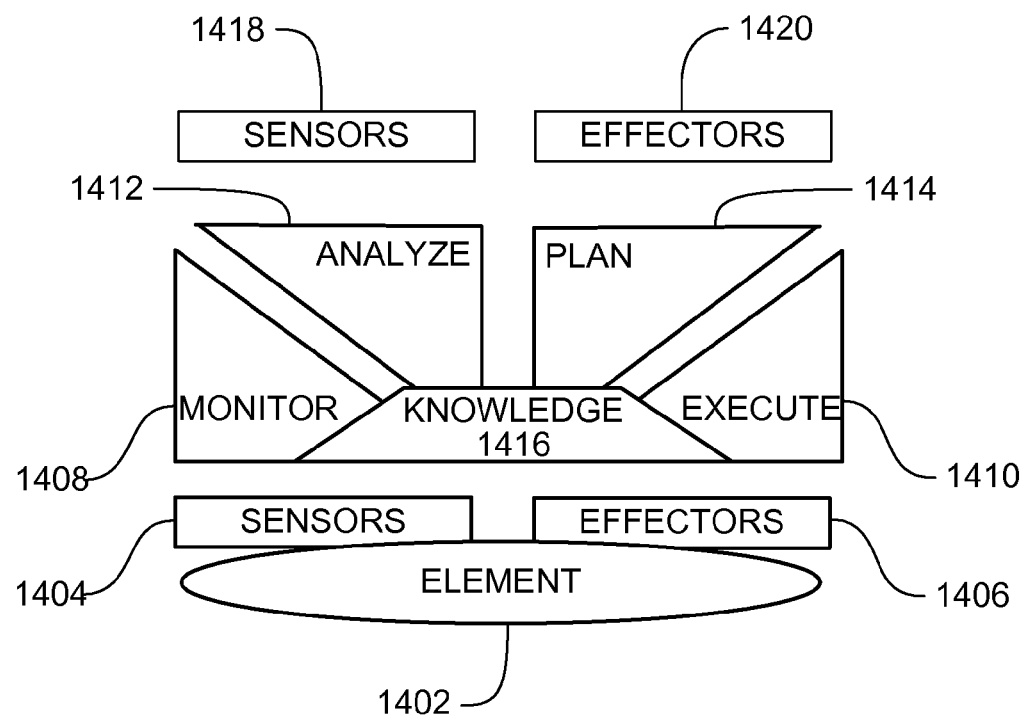
FIG. 14 is a block diagram of an autonomic element, according to an embodiment.

FIG. 14 is a block diagram of an autonomic element 1400 according to an embodiment. Autonomic element 1400 can include an element 1402 that is operably coupled to sensors and 1404 and effectors 1406.

Autonomic element 1400 can also include components that monitor 1408, execute 1410, analyze 1412 and plan 1414; those components can access knowledge 1416. Those components can interact with sensors 1418 and effectors 1420.

Figure 15:
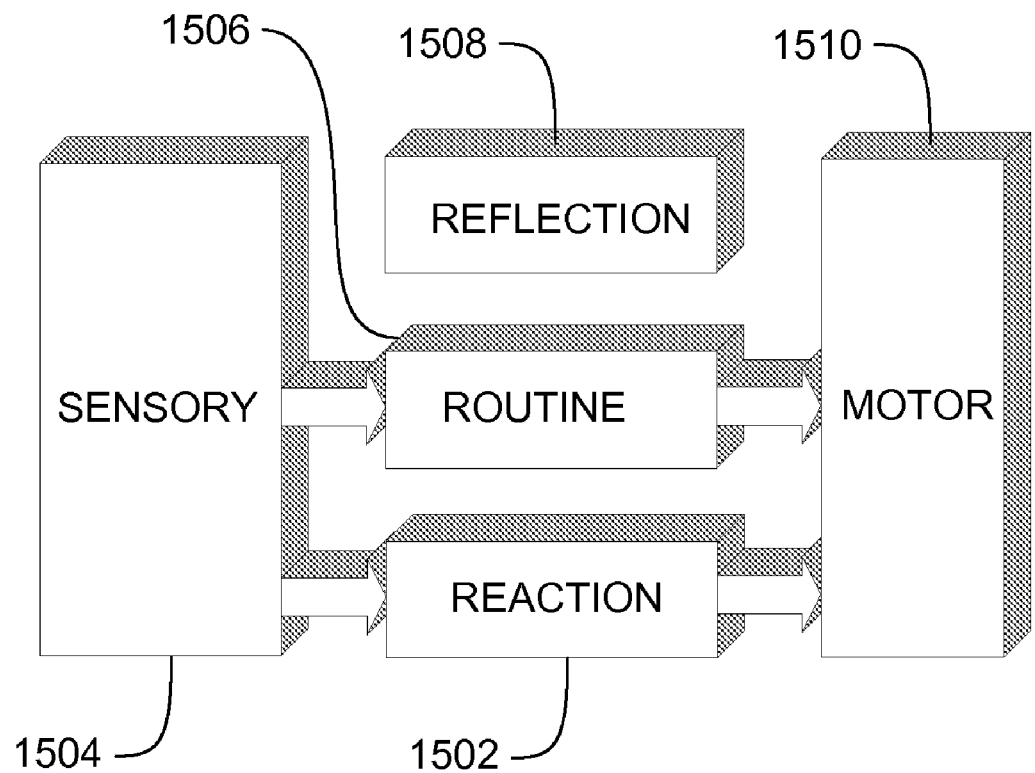
FIG. 15 is a block diagram of autonomy and autonomicity at a high system level, according to an embodiment.

FIG. 15 is a block diagram of autonomy and autonomicity 1500 at a high system level, according to an embodiment. A high level perspective for an intelligent machine design is depicted in FIG. 15. This diagram of autonomy and autonomicity 1500 includes intelligent machine design and system level autonomy and autonomicity.

FIG. 15 describes three levels for the design of intelligent systems:

1) Reaction 1502—the lowest level, where no learning occurs but there is immediate response to state information coming from sensory systems 1504.

2) Routine 1506—middle level, where largely routine evaluation and planning behaviors take place. Input is received from sensory system 1504 as well as from the reaction level and reflection level. This level of assessment results in three dimensions of affect and emotion values: positive affect, negative affect, and (energetic) arousal.

3) Reflection 1508—top level, receives no sensory 1504 input or has no motor 1510 output; input is received from below. Reflection is a meta-process, whereby the mind deliberates about itself. Essentially, operations at this level look at the system's representations of its experiences, its current behavior, its current environment, etc.

As illustrated, input from, and output to, the environment only takes place within the reaction 1502 and routine 1506 layers. One can consider that reaction 1502 level essentially sits within the "hard" engineering domain, monitoring the current state of both the machine and its environment, with rapid reaction to changing circumstances; and, that the reflection 1502 level can reside within an artificial domain utilizing its techniques to consider the behavior of the system and learn new strategies. The routine 1506 level can be a cooperative mixture of both. The high-level intelligent machine design can be appropriate for autonomic systems as depicted here in FIG. 15, in consideration of the dynamics of responses including reaction 1502 and also for reflection 1508 of self-managing behavior.

As depicted autonomic computing can reside within the domain of the reaction 1502 layer as a result of a metaphoric link with the autonomic biological nervous system, where no conscious or cognitive activity takes place. Other biologically-inspired computing (also referred to as nature-inspired computing, organic computing, etc.) can provide such higher level cognitive approaches for instance as in swarm intelligence. Within the autonomic computing research community, autonomicity can not normally be considered to imply this narrower view. Essentially, the autonomic self-managing metaphor can be considered to aim for a user/manager to be able to set high-level policies, while the system achieves the goals. Similar overarching views exist in other related initiatives and, increasingly, they are influencing each other.

In terms of autonomy and autonomicity, autonomy can be considered as being self-governing while autonomicity can be considered being self-managing. At the element level, an element can have some autonomy and autonomic properties, since to self-manage implies some autonomy, while to provide a dependable autonomous element requires such autonomic properties as self-healing along with the element's self-directed task. From this perspective, separation of autonomy and autonomicity as characteristics will decrease in the future and eventually will become negligible. On the other hand, at the system level if one considers again the three tiers of the intelligent machine design (reaction 1502, routine 1506, and reflection 1508) and accepts the narrower view of autonomicity, there is a potential correlation between the levels. That is, the reaction 1502 level correlates with autonomicity, and the reflection 1508 level correlates with autonomy; autonomy as in self-governing of the self-managing policies within the system.

Figure 16:
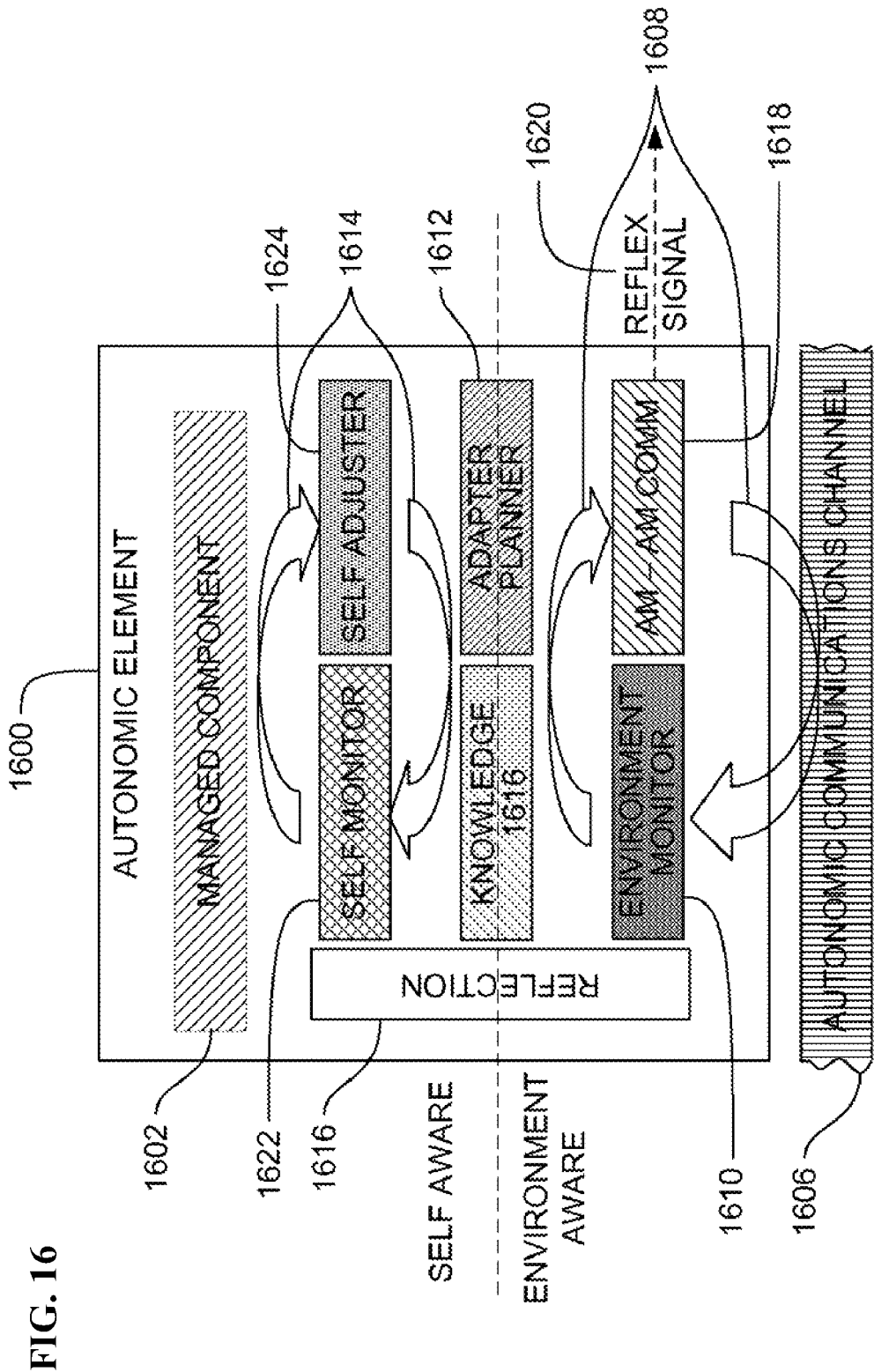
FIG. 16 is a block diagram of an architecture of an autonomic element, according to an embodiment, that includes reflection and reflex layers.

FIG. 16 is a block diagram of an architecture of an autonomic element (AE) 1600 according to an embodiment that includes reflection and reflex layers. The autonomic element 1600 can include a managed component (MC) 1602 that is managed, and the autonomic element 1600 can further include an autonomic manager (AM), not shown. The AM can be responsible for the MC 1602 within the AE 1600. The AM can be designed as part of the component or provided externally to the component, as an agent, for instance. Interaction of the autonomic element 1600 can occur with remote (external) autonomic managers (cf. the autonomic communications channel 1606) through virtual, peer-to-peer, client-server or grid configurations.

An important aspect of the architecture of many autonomic systems can be sensors and effectors, such as shown in FIG. 14. A control loop 1608 can be created by monitoring 1610 behavior through sensors, comparing this with expectations (knowledge 1416, as in historical and current data, rules and beliefs), planning 1612 what action is necessary (if any), and then executing that action through effectors. The closed loop of feedback control 1608 can provide a basic backbone structure for each system component. FIG. 16 describes at least two control loops in the autonomic element 1600, one for self-awareness 1614 and another control loop 1608 for environmental awareness.

In some embodiments, the self-monitor/self-adjuster control loop 1614 can be substantially similar to the monitor, analyze, plan and execute (MAPE) control loop described in FIG. 14. The monitor-and-analyze parts of the structure can perform a function of processing information from the sensors to provide both self-awareness 1614 and an awareness 1608 of the external environment. The plan-and-execute parts can decide on the necessary self-management behavior that will be executed through the effectors. The MAPE components can use the correlations, rules, beliefs, expectations, histories, and other information known to the autonomic element, or available to the autonomic element through the knowledge repository 1416 within the AM 1604.

A reflection component 1616 can perform analysis computation on the AE 1600 (cf. the reflection component 1616 within the autonomic manager). In terms of an autonomic system, reflection can be particularly helpful in order to allow the system to consider the self-managing policies, and to ensure that the policies are being performed as expected. This can be important since autonomicity involves self-adaptation to the changing circumstances in the environment. An autonomic manager communications (AM/AM) component 1618 can also produce a reflex signal 1620. A self adjuster 1622 can be operably coupled to a self-monitor 1624 in the self control loop 1614.

Method Embodiments

In the previous section, apparatus embodiments are described. In this section, the particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware can also be composed of computer-executable instructions. In some embodiments, methods 1700-2600 can be performed by a program executing on, or performed by firmware or hardware that is a part of a computer, such as computer 802 in FIG. 8.

Figure 17:
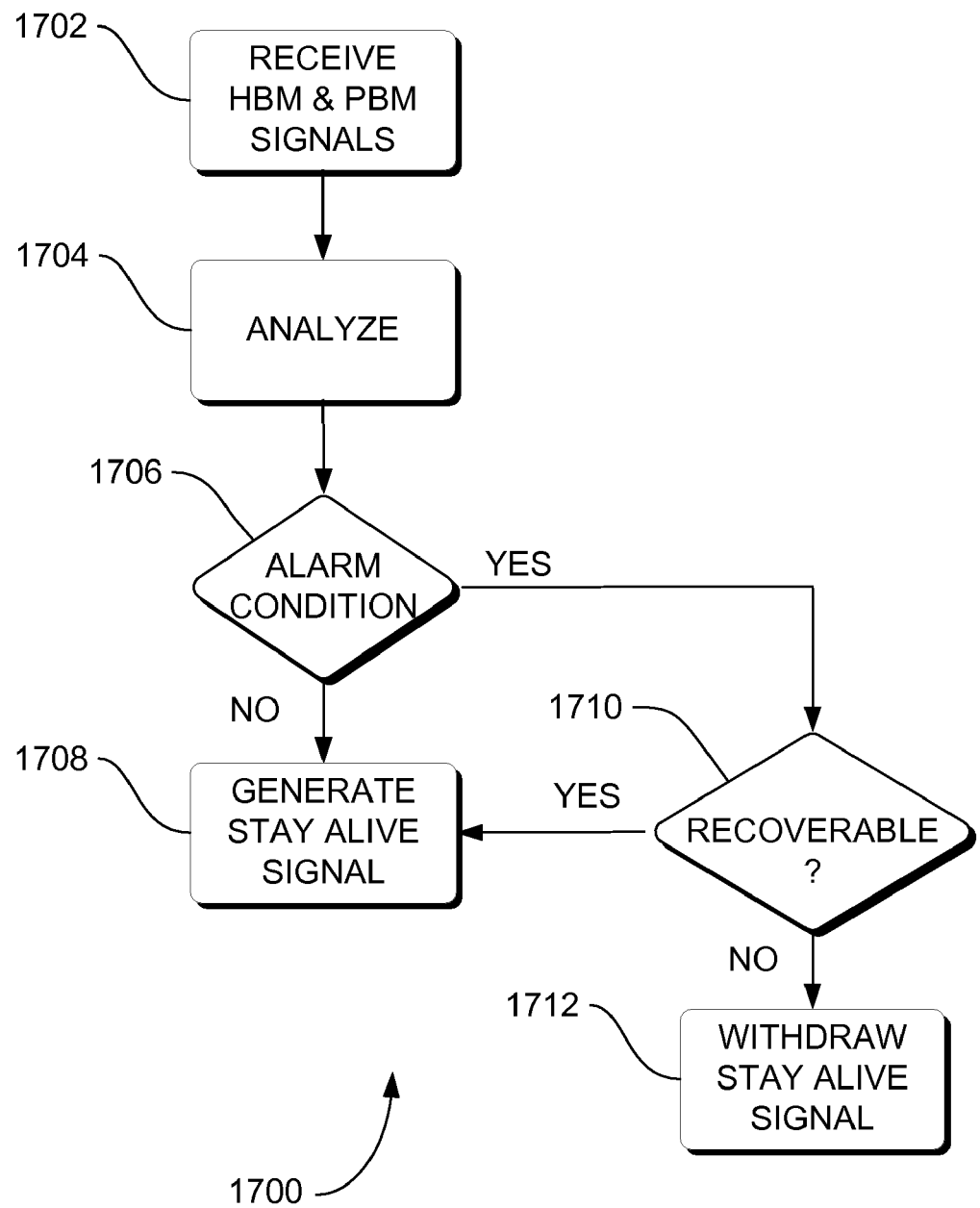
FIG. 17 is a flowchart of a method to construct an environment to satisfy increasingly demanding external requirements, according to an embodiment.

FIG. 17 is a flowchart of a method 1700 to construct an environment to satisfy increasingly demanding external requirements according to an embodiment where a ruler entity decides to withdraw or generate a stay alive signal. Method 1700 manages autonomous entities that can be functionally extracted from an environment upon the occurrence of a predetermined condition.

Method 1700 can begin with action 1702 when receiving a signal from a managed entity. Action 1702 can receive a heart beat monitor (HBM) signal and pulse monitor (PBM) signal from a managed entity such as worker entities 1118 or 1120. The HBM signal can be an indication that the managed entity (worker entity) is operating. The HBM can be an "ON/OFF" state signal, an indication that a process is being performed, or any other signal that can convey information that the worker entity is alive or active. The PBM signal can extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization can be a set of abstractions regarding sensor that can comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 1704 for further processing.

In action 1704, an analysis of the HBM and PBM signal can be performed to determine trends and possible areas of concern. Some purposes of the analysis can be to determine if a predetermined condition is exceeded, to make projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can pass to action 1706 for further processing.

In action 1706, an alarmed condition can be determined. In action 1706, the analysis of action 1704 can be referenced to determine if there is one or more alarm condition that can trigger the withdrawal of a stay alive signal. If no alarm conditions are determined, control can be passed to action 1708 to generate a stay alive signal. In the event that an alarm condition is present, control can be passed to action 1710 for further processing.

In action 1710, a determination can be performed to ascertain whether the identified alarmed condition of action 1706 is recoverable by the managed entity, such as worker entities 1118 and 1120 of FIG. 11. When an alarmed condition is determined to be recoverable, control can be passed to action 1708 to generate a stay alive signal. When an alarmed condition is determined not to be recoverable, control can be passed to action 1712 to withdraw the stay alive signal. Method 1800 below can be one embodiment of determining 1710 if the identified alarmed condition is recoverable.

Figure 18:
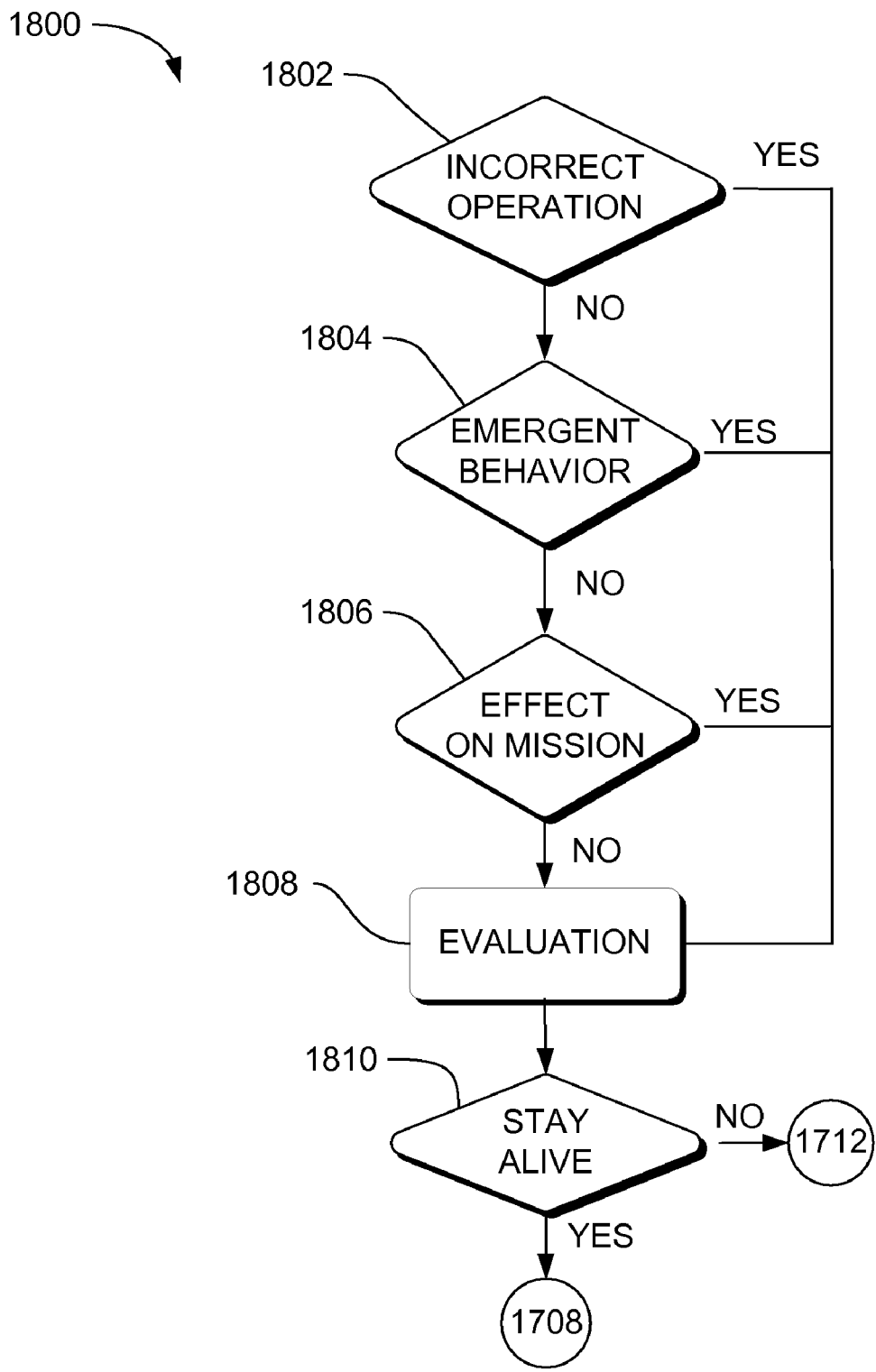
FIG. 18 is a flowchart of a method to construct an environment to satisfy increasingly demanding external requirements, according to an embodiment, where a ruler entity decides to withdraw or generate a stay alive signal.

FIG. 18 is a flowchart of a method 1800 for ascertaining the recoverability of an alarmed condition determined at action 1706 according to am embodiment. Method 1800 manages autonomous entities that can be functionally extracted from an environment upon the occurrence of a predetermined condition. Method 1800 is one possible embodiment of the action in FIG. 17 above of determining 1710 if the identified alarmed condition is recoverable.

Method 1800 can begin with action 1802 when receiving one or more alarmed conditions. In action 1802, a determination is performed of whether or not an incorrect operation from the managed system has been identified in action 1704 of FIG. 17. An incorrect operation can range from not initializing sensors to failing to self-heal when internal decision logic recommends as an appropriate cause of action. In action 1802 in addition to determining if an incorrect operation has been identified, the number of devices or processes within the entity that registered an incorrect operation can be ascertained. If at least one incorrect operation is determined, the action can transfer the identity of the unit to evaluation block 1808 for further processing.

In action 1804, a determination is performed of whether or not emergent behavior from the managed system has been identified in action 1704 of FIG. 17. An emergent behavior or emergent property can appear when a number of entities (agents) operate in an environment forming behaviors that are more complex as a collective. The property itself can often be unpredictable and unprecedented and can represent a new level of the system's evolution. This complex behavior in the context of control system can be known as non-linearity, chaos, or capacity limits. The complex behavior or properties can not be properties of any single such entity, nor can they easily be predicted or deduced from behavior in the lower-level entities. One reason why emergent behavior occurs can be that the number of interactions between autonomic components of a system increases combinatorially with the number of autonomic components, thus potentially allowing for many new and subtle types of behavior to emerge. Nothing can directly command the system to form a pattern, but the interactions of each part (entities) to its immediate surroundings can cause a complex process that leads to order. Emergent behavior can be identified based on parameters that give rise to the complex behavior in a system such as demands on resources. Once an emergent behavior condition has been identified, the information can be forwarded to evaluation block 1808 for further processing.

In action 1806, a determination can be performed of alarm conditions that can have an impact on the success of the mission or task by which all entities are striving to accomplish. The impact could be the ability to accomplish individual tasks or the potential for failure of the overall mission by permitting an entity to stay alive. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined the information can be passed to evaluation block 1808 for further processing.

Evaluation block 1808 can marshal the incorrect operation identified in action 1802, the emergent behavior in action 1804, or the effect on mission in action 1806 to suggest a course of action that the managed entities should adopt, which in the present arrangement is based on a stay alive signal. The determination of withdrawing or affirming the stay alive signal can be based on the occurrence of one or more of the identified alarmed conditions, or a combination of two or more of the identified alarmed conditions. For example, the stay alive signal could be withdrawn if there is emergent behavior and there would be an effect on the mission. In the alternative, the stay alive signal could be affirmed if there was only emergent behavior, or incorrect operation. Once the evaluation is determined, control can be passed to decision block 1810 for further processing in accordance to the decision made in evaluation block 1808.

In action 1810, if the desired control instruction is to maintain the stay alive signal, control can be passed to action 1708 for further processing. In the alternative, a withdrawal of the stay alive signal can be sent to action 1712 for further processing. Generating a stay alive signal can be equivalent to generating a stay alive signal, affirming a stay alive signal, not withdrawing a stay alive signal, or any other condition that can determine if an entity is to perish or to extinguish unless allowed to continue by another entity. The other entity might be a managing entity since the other entity can determine the outcome (life or death) of an entity.

Figure 19:
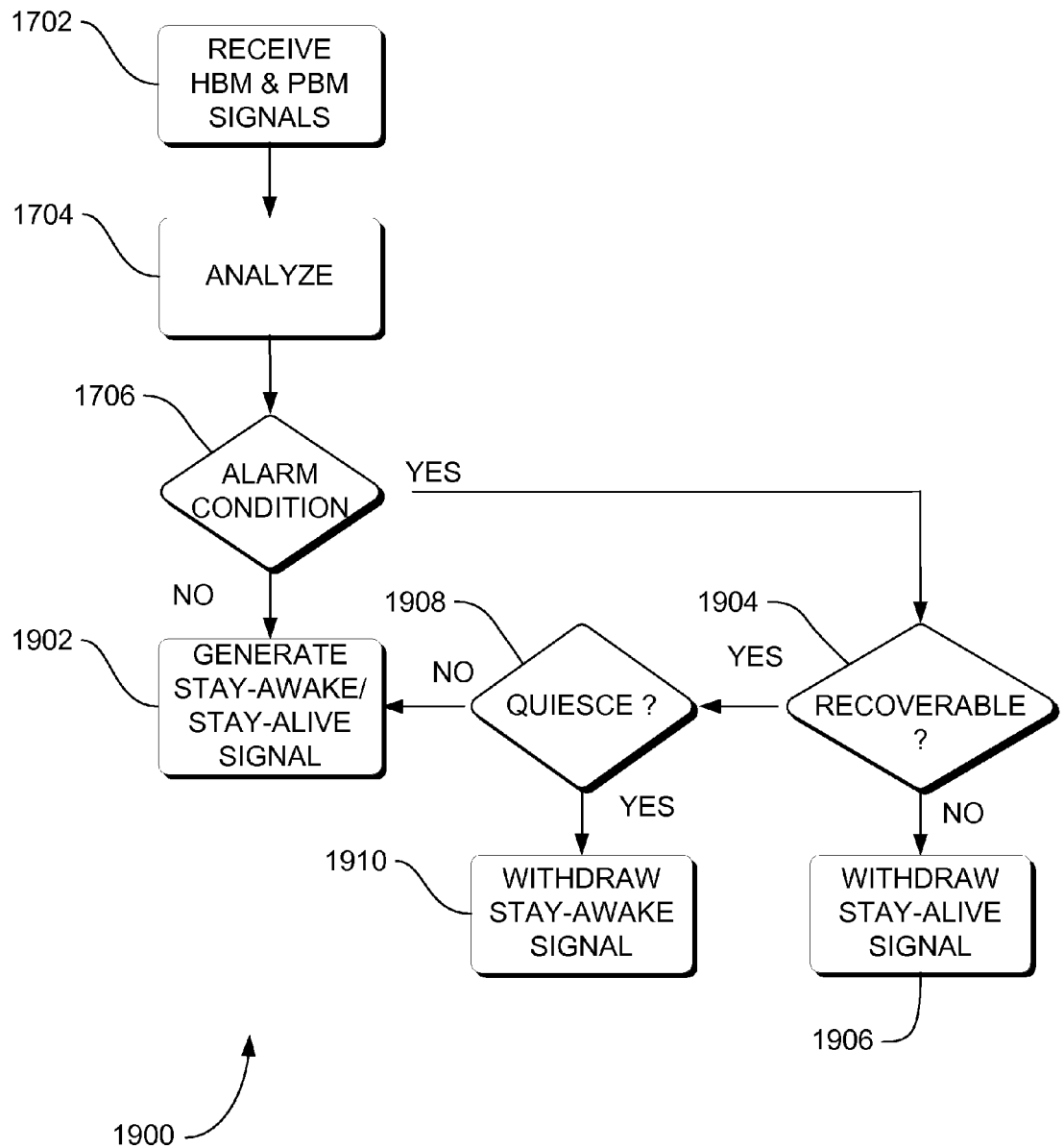
FIG. 19 is a flowchart for a generating stay-alive signal when a warning condition occurs, according to an embodiment.

FIG. 19 is a flowchart of a method 1900 to construct an environment to satisfy increasingly demanding external requirements according to an embodiment where a ruler entity decides to withdraw or generate a stay-awake signal. Method 1900 reduces the possibility that an autonomic element will jeopardize the mission of the autonomic element.

Method 1900 can begin with action 1702 when receiving a signal from a managed entity. Action 1702 can receive a heart beat monitor (HBM) signal and pulse monitor (PBM) signal from a managed entity such as worker entities 1118 or 1120. In some embodiments, the HBM signal is an indication that the managed entity (worker entity) is operating. The HBM can be an "ON/OFF" state signal, an indication that a process is being performed, or any other signal that can convey information that the worker entity is awake or active. The PBM signal can extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization could be a set of abstractions regarding sensors that, in some embodiments, could comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 1704 for further processing.

In action 1904, an analysis of the HBM and PBM signal can be performed to determine trends and possible areas of concern. The purpose of the analysis can be to determine that a predetermined condition has been exceeded, generate a projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can be passed to action 1706 for further processing.

In action 1706, an alarmed condition can be determined. In action 1706, the analysis of action 1704 can be referenced to determine if there is one or more alarm condition that can trigger the withdrawal of a stay-awake signal. If no alarm conditions are determined, control can be passed to action 1902 to generate a stay-alive signal. In the event that an alarm condition is present, control can be passed to action 1904 for further processing.

In action 1904, a determination can be performed to ascertain if the identified alarmed condition of action 1706 is recoverable by the managed entity such as worker entities 1118 and 1120 of FIG. 11. When an alarmed condition is determined not to be recoverable, control can be passed to action 1712 to withdraw the stay-alive signal. Method 2000 below could be one embodiment of determining 1904 if the identified alarmed condition is recoverable. When an alarmed condition is determined to be recoverable, control can be passed to action 1908 in which a determination can be performed to ascertain if quiescing the managed entity and/or subsequent recovery is possible. When quiescence of the managed entity and/or need for later recovery is determined as not possible, control can pass to action 1902 to generate a stay-awake/stay-alive-signal. When quiesence of the managed entity is determined as possible and/or needed in action 1908, control can pass to action 1910, to withdraw the stay-awake signal. Thus, quiescing the managed entity functionally extracts the managed entity from an environment upon the occurrence of an alarmed condition. Quiescence can be a less encompassing alternative to withdrawing the stay-awake signal of apoptosis. Method 1900 can allow an agent or craft that is in danger or endangering the mission to be put into a self-sleep mode, then later reactivated or self-destructed.

Figure 20:
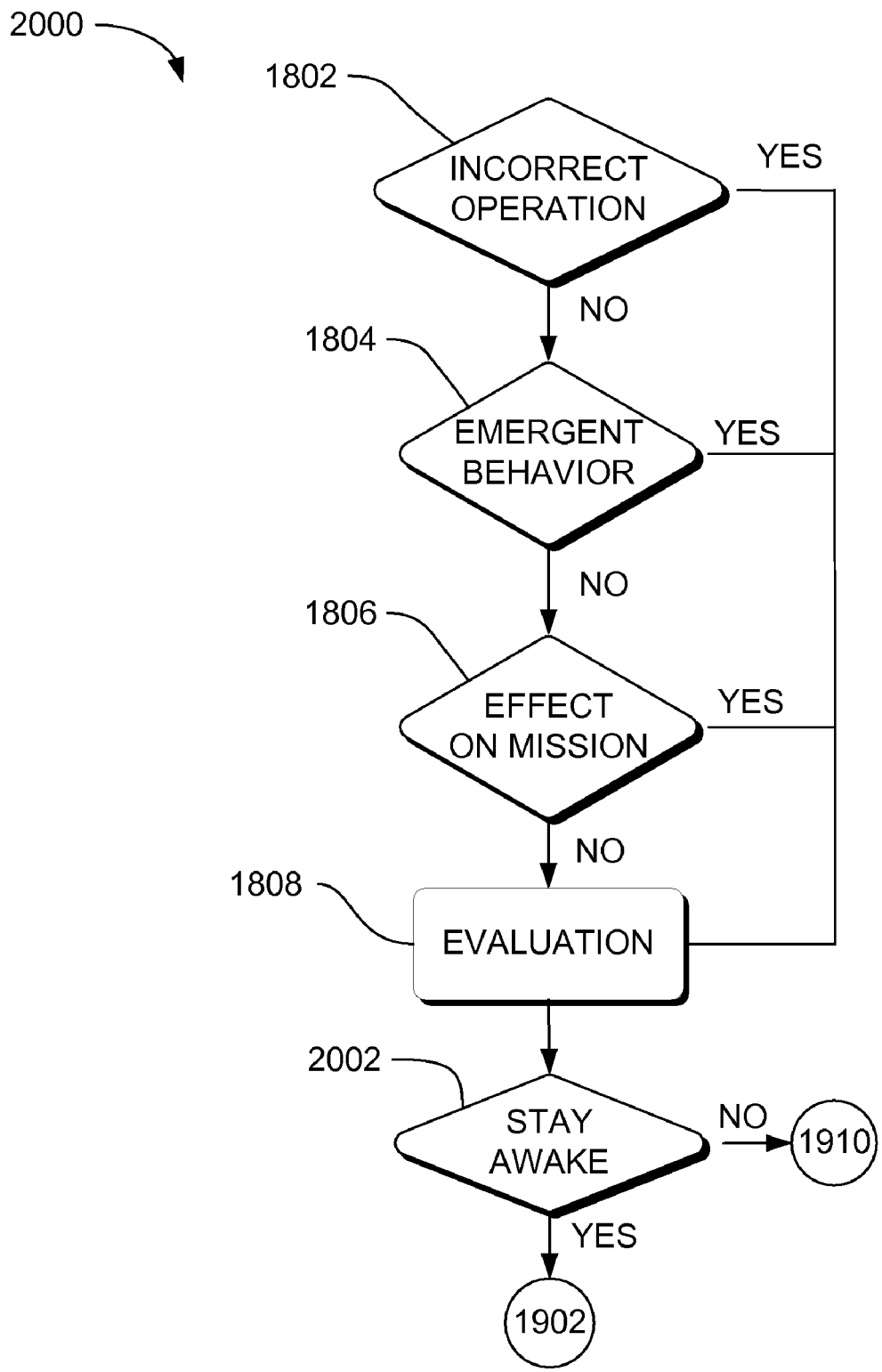
FIG. 20 is a flowchart of a method to construct an environment to satisfy increasingly demanding external requirements, according to an embodiment, where a ruler entity decides to withdraw or generate a stay-awake signal.

FIG. 20 is a flowchart of a method 2000 for ascertaining the recoverability of an alarmed condition determined at action 1904. Method 2000 manages autonomous entities that can be functionally extracted from an environment upon the occurrence of a predetermined condition.

Method 2000 can begin with action 1802 when receiving one or more alarmed conditions. In action 1802, a determination is performed as to whether or not an incorrect operation from the managed system has been identified in action 1704 of FIG. 17. An incorrect operation can range from not initializing sensors to failing to self-heal when internal decision logic recommends as an appropriate cause of action. In action 1802, in addition to determining if an incorrect operation has been identified, the number of devices or processes within the entity that registered an incorrect operation can be ascertained. If at least one incorrect operation is determined, the action can transfer the identity of the unit to evaluation block 1808 for further processing.

In action 1804, there can be a determination of emergent behavior from the managed system that has been identified in action 1704 of FIG. 17. An emergent behavior or emergent property can appear when a number of entities (agents) operate in an environment forming behaviors that are more complex as a collective. The property itself can often be unpredictable and unprecedented and can represent a new level of the system's evolution. This complex behavior in the context of control system can be known as non-linearity, chaos, or capacity limits. The complex behavior or properties can not be properties of any single such entity, nor can they easily be predicted or deduced from behavior in the lower-level entities. One reason why emergent behavior occurs could be that the number of interactions between autonomic components of a system increases combinatorially with the number of autonomic components, thus potentially allowing for many new and subtle types of behavior to emerge. Nothing can directly command the system to form a pattern, but instead the interactions of each part (entities) to its immediate surroundings can cause a complex process that leads to order. Emergent behavior can be identified based on parameters that give rise to the complex behavior in a system such as demands on resources. Once an emergent behavior condition has been identified, the information can be forwarded to evaluation block 1808 for further processing.

In action 1806, a determination can be performed of alarm conditions that can have an impact on the success of the mission or task which all entities are striving to accomplish. The impact could be the ability to accomplish individual tasks or the potential for failure of the overall mission by permitting an entity to stay awake. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined, the information can be passed to evaluation block 1808 for further processing.

Evaluation block 1808 can marshal the incorrect operation identified in action 1802, the emergent behavior in action 1804, and the effect on mission in action 1806 to suggest a course of action that the managed entities should adopt, which in the present arrangement is based on a stay-awake signal. The determination of withdrawing or affirming the stay-awake signal can be based on the occurrence of one or more of the identified alarmed conditions, or a combination of two or more of the identified alarmed conditions. For example, the stay-awake signal could be withdrawn if there is emergent behavior and there would be an effect on the mission. In the alternative, the stay-awake signal could be affirmed if there was only emergent behavior, or incorrect operation. Once the evaluation is determined, control can pass to decision block 2002 for further processing in accordance with the decision made in evaluation block 1808.

In action 2002, if the desired control instruction is to maintain the stay-awake signal, control can be passed to action 1902 for further processing. In the alternative, a withdrawal of the stay-awake signal can be sent to action 1910 for further processing. Generating a stay-awake signal is equivalent to affirming a stay awake signal, not withdrawing a stay awake signal, or any other condition that can determine if an entity is to perish or to extinguish unless allowed to continue by another entity. The other entity could be a managing entity since the other entity can determine the outcome (life or death) of an entity.

Figure 21:
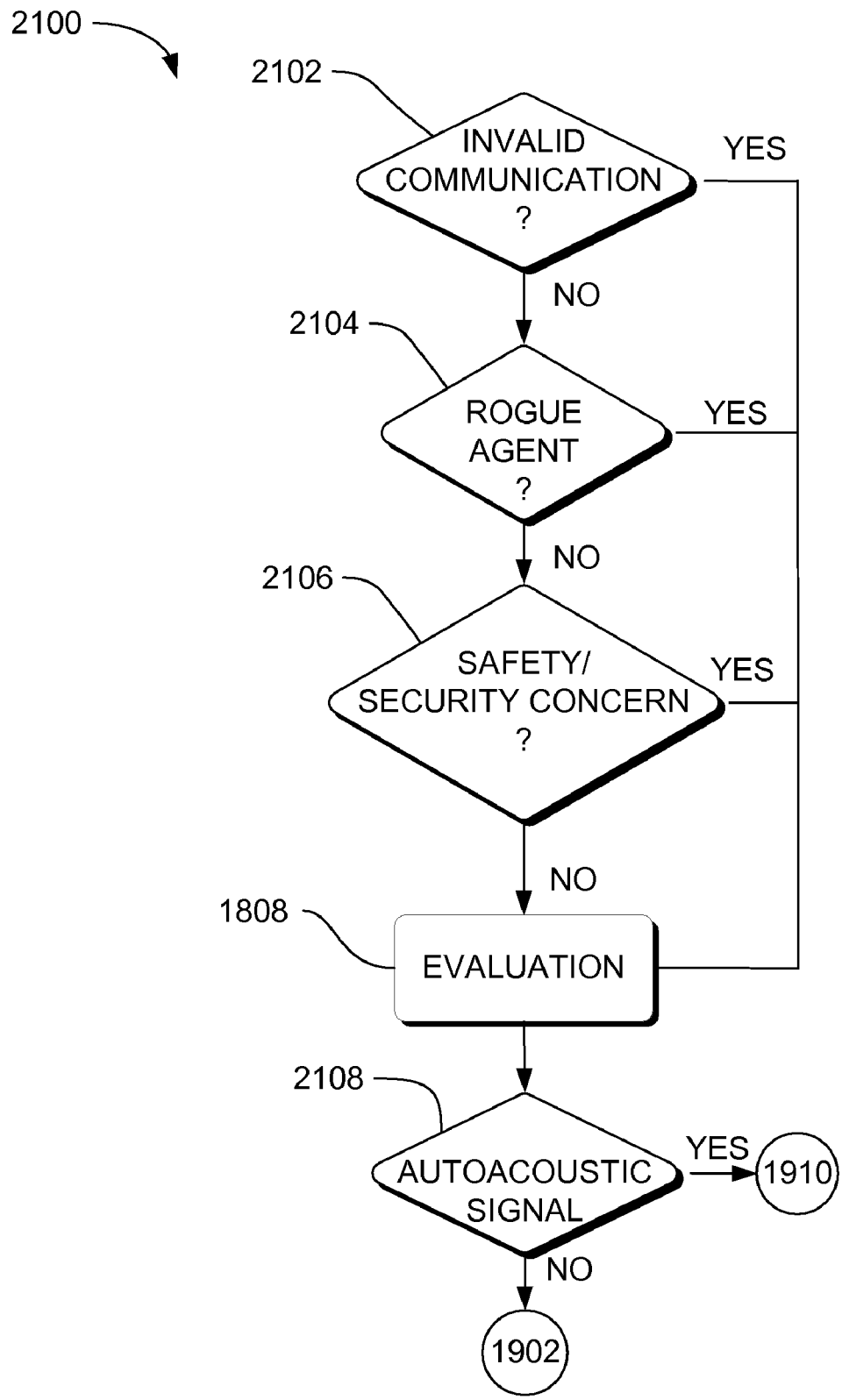
FIG. 21 is a flowchart for generating an otoacoustic signal when a warning condition occurs, according to an embodiment.

FIG. 21 is a flowchart of a method 2100 for ascertaining the recoverability of an alarmed condition determined at action 1904. Method 2100 manages autonomous entities that can be functionally extracted from an environment upon the occurrence of a predetermined condition.

Method 2100 can begin with action 2102 after having received one or more alarmed conditions. In action 2102, a determination is performed as to whether or not an invalid communication from the managed system has been identified in action 1704 of FIG. 17. In action 2102, in addition to determining if an invalid communication has been identified, the number of devices or processes within the entity that registered an invalid communication can be ascertained. If at least one invalid communication is determined, the identity of the unit can be transferred to evaluation block 1808 for further processing. An invalid communication is a communication handshake that doesn't match an expected protocol, such as the "rogue" agent didn't respond in the expected manner, or in the expected time limits, or failed to send a signal in the correct format.

In action 2104, a determination is performed as to whether or not a rogue agent from the managed system that has been identified in action 1704 of FIG. 17. A rogue agent can exist when a number of entities (agents) operate in an environment forming behaviors that are more complex as a collective. One cause of a rogue agent could be that the number of interactions between autonomic components of a system increases combinatorially with the number of autonomic components, thus potentially allowing for many new and subtle types of counterproductive behavior to emerge. Nothing can directly command the system to form a pattern, but instead the interactions of each part (entities) to its immediate surroundings can cause a complex process that leads to order. A rogue agent can be identified based on parameters that give rise to the complex behavior in a system such as demands on resources. Once a rogue agent has been identified, the information can be forwarded to evaluation block 1808 for further processing.

In action 2106, a determination can be performed of safety/security issue/concerns that can have an impact on the success of the mission or task which all entities are configured to accomplish. The impact could be the ability to accomplish individual tasks or the potential for failure of the overall mission by permitting an entity to stay awake. This impact can be determined through Bayesian belief networks, statistical inference engines, or by any other presently developed or future developed inference engine that can ascertain the impact on a particular task if one or more agent is showing invalid communication or harmful rogue agent. Once the safety/security issue/concern has been determined, the information can be passed to evaluation block 1808 for further processing.

Evaluation block 1808 can marshal the invalid communication identified in action 2102, the rogue agent in action 2104, and the safety/security issue/concern in action 2106 to suggest a course of action that the managed entities should adopt, which in the present arrangement is based on a stay-awake signal. The determination of withdrawing or affirming the stay-awake signal can be based on the occurrence of one or more of the identified alarmed conditions, or a combination of two or more of the identified alarmed conditions. For example, the stay-awake signal could be withdrawn if there is rogue agent and there would be a safety/security issue/concern of the mission. In the alternative, the stay-awake signal could be affirmed if there was only rogue agent, or invalid communication. Once the evaluation is determined, control can pass to decision block 2002 for further processing in accordance with the decision made in evaluation block 1808.

In action 2108, if the desired control instruction is not to transmit an otoacoustic signal, control can be passed to action 1902 for further processing. In the alternative, an otoacoustic signal can be sent in action 1910 for further processing. The self managing autonomous system can self-protect from spurious signals or signals generated by a rogue agent that has failed to engage in a satisfactory ALice exchange by generating an otoacoustic signal. An otoacoustic signal is a counteracting signal to the spurious signals or signals generated by a rogue agent that is intended to stop the self managing autonomous system from receiving, or at least from reacting to, these unwanted signals, effectively having an overriding effect or an equalizing effect on any reflex signal received by the self managing autonomous system. In essence, counter-signals can be generated that will render the undesirable signals harmless to the self managing autonomous system. The security and protection of the self managing autonomous system may be improved by the use of the otoacoustic signal. The otoacoustic signal can help ensure that self-managing complex systems operate correctly without human intervention where management by humans is simply not realistic or even feasible.

Generating an otoacoustic signal can be equivalent to affirming an otoacoustic signal, not withdrawing an otoacoustic signal, or any other condition that can determine if an entity is to counteract a spurious signal or signal from a rogue agent. The other entity could be a managing entity since the other entity can determine the outcome (life or death) of an entity.

The present invention may draw inspiration from or have some similarities to the mammalian acoustic or stapedius reflex, although one skilled in the art will recognize that when in danger of exposure to extreme sounds that may damage the ear drum, the mammalian body protects itself. The acoustic reflex, or stapedius reflex, is an involuntary muscle contraction in the middle ear of mammals in response to high-intensity sound stimuli. The mammalian otoacoustic mechanism, called otoacoustic emission, involves the generation of sound from within the inner ear in response to over-activity of the cochlear amplifier. That is, when the body is presented with a sound that is potentially damaging, the inner ear generates a counter-sound, which is benign, and protects the inner ear from hearing it.

In some embodiments, all of the agents, components and apparatus of FIG. 1-6 or 11-16 can detect and/or issue the otoacoustic signal, as long as the agents, components and apparatus are "friendly" (i.e., known not to be rogue) agents. In some embodiments, however, only a coordinating agent, such as ruler NBF 608, can perform method 2100.

Figure 22:
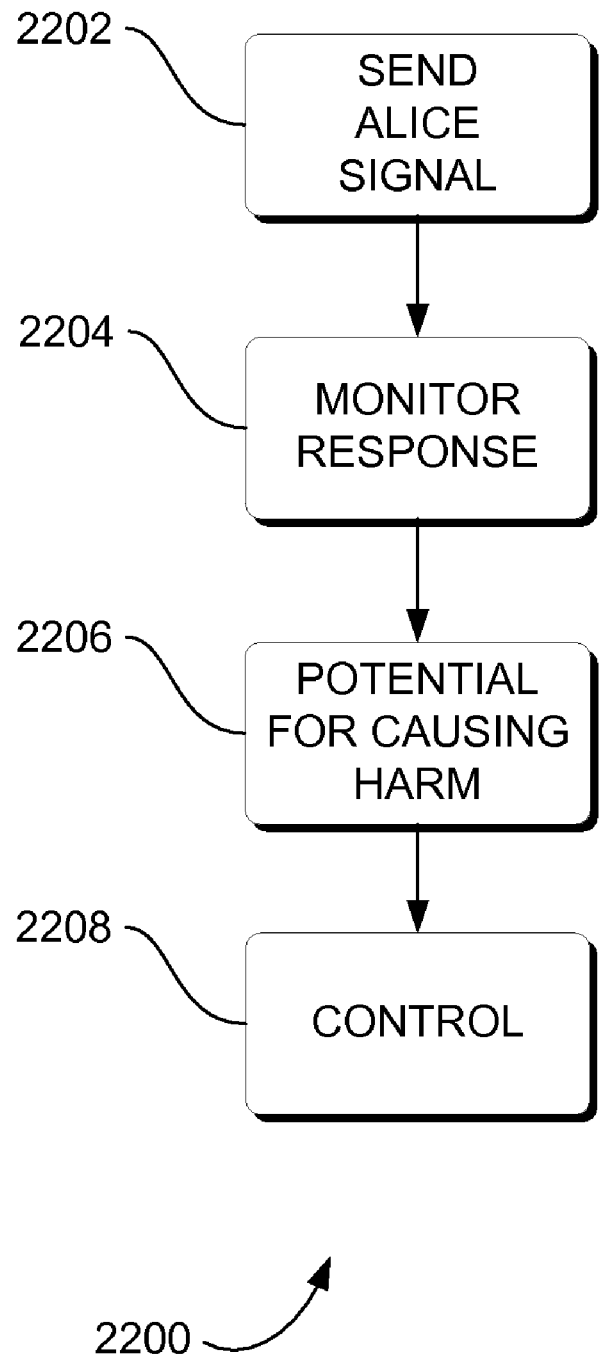
FIG. 22 is a flowchart for interrogating an anonymous autonomic agent, according to an embodiment.

FIG. 22 is a flowchart of a method 2200 for providing security requirements according to an embodiment where a ruler entity decides to withdraw or generate a stay alive signal from an anonymous agent. Method 2200 manages autonomous entities that can be functionally extracted from an environment upon the occurrence of a predetermined condition. Method 2200 can begin with action 2202 where an ALice signal is sent to an anonymous agent to ascertain the potential for harm of the agent to a system as shown in FIG. 22. After the ALice signal has been sent to the agent, control can be passed to action 2204 for further processing.

In action 2204 the response from the agent can be monitored. Monitored as used herein refers to maintaining regular surveillance, or close observation, over an anonymous agent and can include the absence of a signal. For example, not responding with a timeout period is considered, as used herein, as monitor response. After action 2204 is completed, control can be passed to action 2206 for further processing.

In action 2206, the monitored response from action 2204 can be analyzed to determine if the monitored response is in an appropriate format, within a certain timeout period, and with a valid and justified reason for being within the locust of interest or domain of the autonomous system 2204 as shown in FIG. 22. Once the potential for causing harm has been ascertained, control can be passed to action 2208 for further processing.

In action 2208, the system can control the future of the anonymous agent based on the potential for harm to the autonomous system. This mimics the mechanism of cell death in the human (and animal) body, and hence makes use of autonomic and other biologically inspired metaphors. The technique would send self-destruct signals to agents that can be compromised, or which cannot be identified as friendly or as having a right to access certain resources. The concept of the ALice signal is to challenge a mobile agent to determine if the mobile agent is friendly and to determine if the mobile agent has permission to access certain resources. If the mobile agent fails to identify itself appropriately following an ALice interrogation, the mobile agent can be blocked from the system and given either a self-destruct signal, or its stay alive reprieve is withdrawn. As an alternative to the ALice signal, a quiesce signal, command or instruction can be sent. The quiesce signal is discussed in more detail in conjunction with FIGS. 10, 19 and 20.

Figure 23:
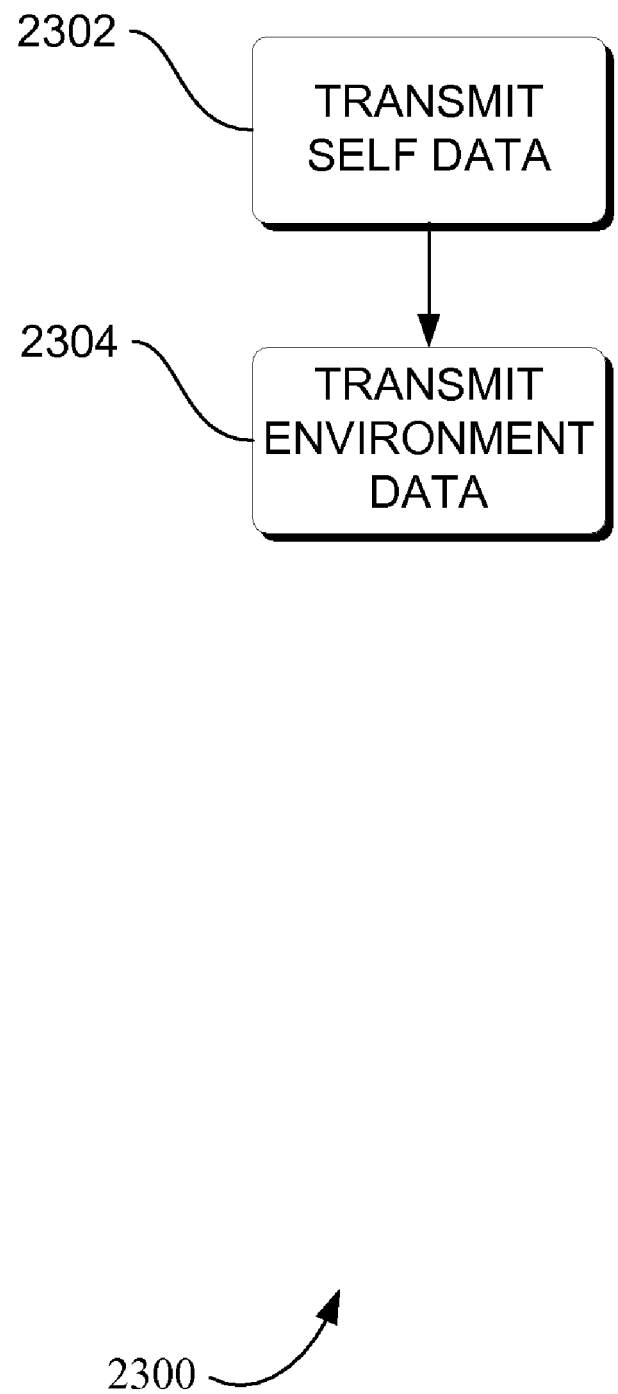
FIG. 23 is a flowchart of a method of autonomic communication by an autonomic element, according to an embodiment.

FIG. 23 is a flowchart of a method 2300 of autonomic communication by an autonomic element. Method 2300 can offer a holistic vision for the development and evolution of computer-based systems that brings new levels of automation and dependability to systems, while simultaneously hiding their complexity and reducing their total cost of ownership.

Method 2300 can include transmitting self health/urgency data 2302. Examples of the self health/urgency data can include information describing low battery power and/or failed sensors. Method 2200 can also include transmitting 2304 environment health/urgency data. Examples of the environment health/urgency data can include information describing inaccessible devices, unauthorized access, and/or an unidentified mobile agent sending communication signals.

Transmitting 2302 and 2304 can be performed in any order relative to each other. For example, in one embodiment the transmitting 2302 self health/urgency data can be performed before transmitting 2304 environment health/urgency data. In another embodiment, transmitting 2304 environment health/urgency data can be performed before transmitting 2302 self health/urgency data. In yet another embodiment, the self health/urgency data can be transmitted simultaneously with the environment health/urgency data. For example, the environment health/urgency data and the self health/urgency data can be transmitted together. One example of transmitting the environment health/urgency data and the self health/urgency data can include encapsulating the environment health/urgency data and the self health/urgency data in a X.25 packet, although one skilled in the art will readily recognize that any number of alternative packet types can be used that fall within the scope of this invention. The environment health/urgency data and the self health/urgency data can be thought of together as the "lub-dub" of a heartbeat in which the two "beats" or two pieces of data are transmitted simultaneously. The X.25 standard is published by the ITU Telecommunication Standardization Sector at Place des Nations, CH-1211 Geneva 20, Switzerland.

An autonomic environment can require that autonomic elements and, in particular, autonomic managers communicate with one another concerning self-* activities, in order to ensure the robustness of the environment. A reflex signal 1620 of FIG. 16 above can be facilitated through the pulse monitor (PBM). A PBM can be an extension of the embedded system's heart-beat monitor, or HBM, which safeguards vital processes through the emission of a regular "I am alive" signal to another process with the capability to encode self health/urgency data and environment health/urgency data as a single pulse. HBM is described in greater detail in FIGS. 14 and 21 above. Together with the standard event messages on an autonomic communications channel, this can provide dynamics within autonomic responses and multiple loops of control, such as reflex reactions among the autonomic managers. Some embodiments of the autonomic manager communications (AM/AM) component 1618 can produce a reflex signal 1620 that includes the self health/urgency data and the environment health/urgency data in addition to the HBM. More concisely, the reflex signal can carry a PBM. A reflex signal that carries a PBM can be used to safe-guard the autonomic element by communicating health of the autonomic element to another autonomic unit. For instance, in the situation where each PC in a LAN is equipped with an autonomic manager, rather than each of the individual PCs monitoring the same environment, a few PCs (likely the least busy machines) can take on this role and alert the others through a change in pulse to indicate changing circumstances.

An important aspect concerning the reflex reaction and the pulse monitor is the minimization of data sent—essentially only a "signal" is transmitted. Strictly speaking, this is not mandatory; more information can be sent, yet the additional information should not compromise the reflex reaction.

Just as the beat of the heart has a double beat (lub-dub), the autonomic element's pulse monitor can have a double beat encoded—as described above, a self health/urgency measure and an environment health/urgency measure. These match directly with the two control loops within the AE, and the self-awareness and environment awareness properties.

Figure 24:
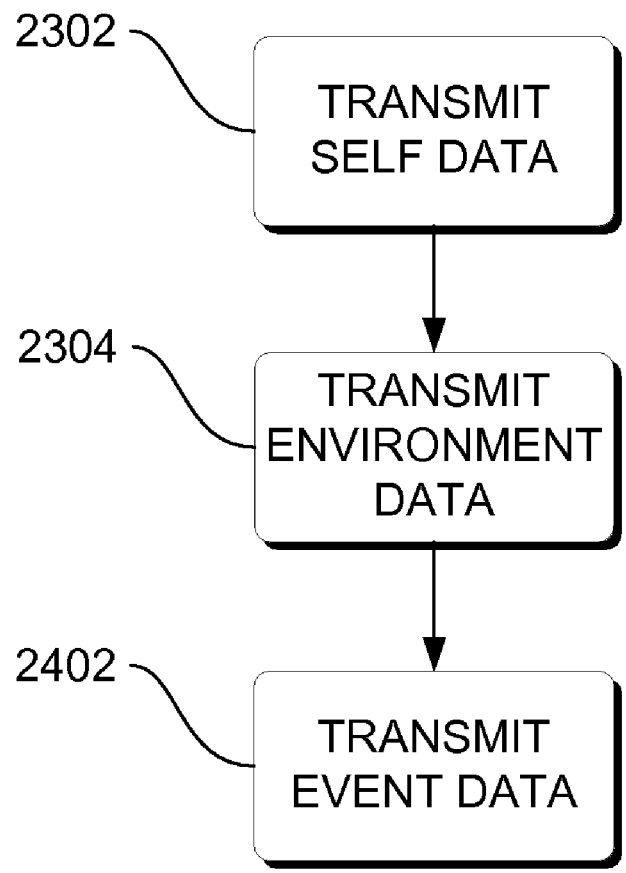
FIG. 24 is a flowchart of a method of autonomic communication by an autonomic element, according to an embodiment.

FIG. 24 is a flowchart of a method 2400 of autonomic communication by an autonomic element. Method 2400 can include transmitting 2402 event message data in addition to the self and environment health/urgency data. Event message data can include data describing a change in condition, or a deviation from a normal operation. Event message data is described in more detail above in FIG. 11.

In some embodiments, the self health/urgency data and environment health/urgency data encoded with the standard event messages on an autonomic communications channel, can provide dynamics within autonomic responses and multiple loops of control, such as reflex reactions among an autonomic manager.

Figure 25:
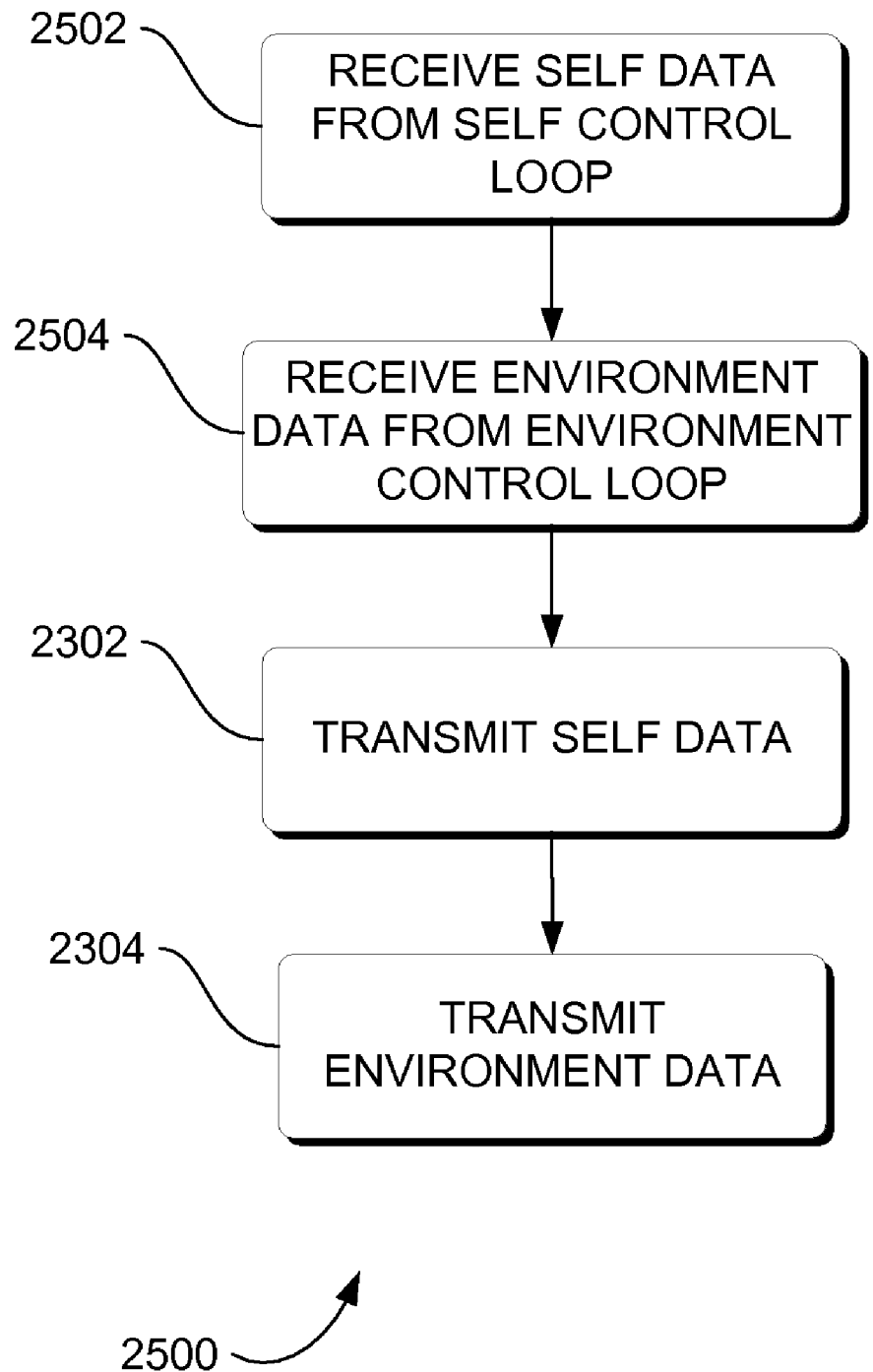
FIG. 25 is a flowchart of a method of autonomic communication by an autonomic element, according to an embodiment.

FIG. 25 is a flowchart of a method 2500 of autonomic communication by an autonomic element. Method 2500 can include receiving 2502 the self health/urgency data from a self control loop component of the autonomic element. One example of the self control loop component of the autonomic element can be the self awareness control loop 1614 of the autonomic element 1600 of FIG. 16 above.

Method 2500 can also include receiving 2504 the environment health/urgency data from an environment control loop component of the autonomic element. One example of the environment control loop component of the autonomic element can be the environment awareness control loop 1608 of the autonomic element 1600 of FIG. 16 above.

Figure 26:
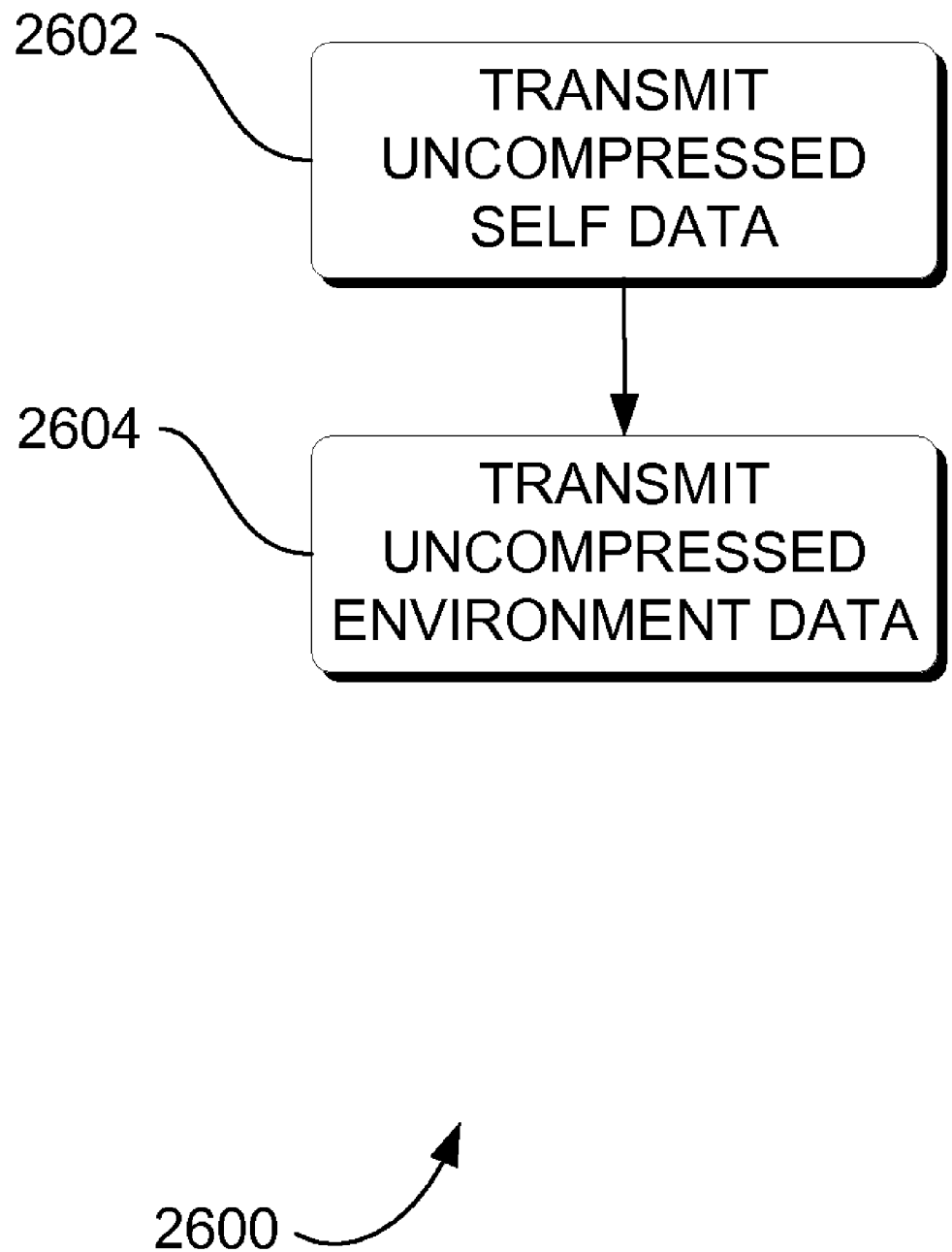
FIG. 26 is a flowchart of a method of autonomic communication by an autonomic element, according to an embodiment.

FIG. 26 is a flowchart of a method 2600 of autonomic communication by an autonomic element. Method 2600 can offer a holistic vision for the development and evolution of computer-based systems that brings new levels of automation and dependability to systems, while simultaneously hiding their complexity and reducing processing delays by systems that receive data from the autonomic element.

Method 2600 can include transmitting uncompressed self health/urgency data 2602. Method 2600 can also include transmitting 2604 uncompressed environment health/urgency data. In the absence of bandwidth concerns, the uncompressed data can be acted upon quickly and not incur processing delays. One important aspect can be that the data, whether uncompressed or sent in some other form, should be in a form that can be acted upon immediately and not involve processing delays (such as is the case of event correlation). Transmitting 2602 and 2604 can be performed in any order relative to each other.

Conclusion

An otoacoustic component of an autonomic unit can render an incoming potentially harmful signal inert. Self-managing systems, whether viewed from the autonomic computing perspective, or from the perspective of another initiative, can offer a self-defense capability that brings new levels of automation and dependability to systems, while simultaneously hiding their complexity and reducing their total cost of ownership.

Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations. For example, although described in procedural terms, one of ordinary skill in the art will appreciate that implementations can be performed in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all environments and alternate technologies which provide the same functionality as described herein.

We claim:

1. A computer-accessible medium having executable instructions to construct an environment to satisfy increasingly demanding external requirements, the executable instructions capable of directing a processor to perform:
 instantiating an embryonic evolvable neural interface; and
 evolving the embryonic evolvable neural interface towards complex complete connectivity,
 wherein the evolvable neural interface receives one or more heart beat monitor signals, pulse monitor signals, and otoacoustic signals,
 wherein the evolvable neural interface generates one or more heart beat monitor signals, pulse monitor signals, and otoacoustic signals, and
 wherein the embryonic evolvable neural interface further comprises a neural thread possessing a most primitive and minimal connectivity.

* * * * *